(12) United States Patent
Ishibashi

(10) Patent No.: US 9,257,861 B2
(45) Date of Patent: Feb. 9, 2016

(54) CONTROL APPARATUS AND CONTROL METHOD

(71) Applicant: Sony Corporation, Tokyo (JP)

(72) Inventor: Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 529 days.

(21) Appl. No.: 13/664,837

(22) Filed: Oct. 31, 2012

(65) Prior Publication Data

US 2014/0117943 A1 May 1, 2014

(30) Foreign Application Priority Data

Nov. 7, 2011 (JP) ................................. 2011-244038

(51) Int. Cl.
*H02J 7/00* (2006.01)
*H02J 7/35* (2006.01)

(52) U.S. Cl.
CPC ............... *H02J 7/007* (2013.01); *H02J 7/0013* (2013.01); *H02J 7/35* (2013.01)

(58) Field of Classification Search
CPC ........ Y02E 60/12; H02J 7/0068; H02J 7/022; H02J 7/0073; H01M 10/44
USPC ........................................................ 320/137
See application file for complete search history.

(56) References Cited

U.S. PATENT DOCUMENTS

| | | | | |
|---|---|---|---|---|
| 5,486,749 A | * | 1/1996 | Brainard ....................... | 320/125 |
| 5,751,133 A | * | 5/1998 | Sato et al. .................... | 320/101 |
| 6,191,560 B1 | * | 2/2001 | Sakakibara ................... | 320/150 |
| 6,194,869 B1 | * | 2/2001 | Peterzell ....................... | 320/134 |
| RE37,678 E | * | 4/2002 | Ikawa et al. .................. | 320/136 |
| 6,498,459 B1 | * | 12/2002 | Okumura et al. ............. | 320/128 |
| 7,304,454 B2 | * | 12/2007 | Inui et al. ..................... | 320/155 |
| 7,348,760 B2 | * | 3/2008 | Bucur et al. .................. | 320/132 |
| 7,521,893 B2 | * | 4/2009 | Tsuchiya et al. ............. | 320/128 |
| 2004/0051497 A1 | * | 3/2004 | Richards et al. ............. | 320/103 |
| 2008/0174278 A1 | * | 7/2008 | Masias et al. ................ | 320/138 |
| 2012/0025769 A1 | * | 2/2012 | Kikuchi et al. ............... | 320/118 |
| 2013/0044402 A1 | * | 2/2013 | Mukai et al. ................. | 361/104 |

FOREIGN PATENT DOCUMENTS

JP   2006-034047   2/2006

* cited by examiner

*Primary Examiner* — M'Baye Diao
(74) *Attorney, Agent, or Firm* — Hazuki International, LLC

(57) ABSTRACT

Disclosed herein is a control apparatus, including: a supplying section to which a voltage which varies in response to a variation of a state is supplied from an electric power generation section; and a control section configured to change the number of battery units, for which charging is to be carried out, in response to a relationship between the voltage and a reference value.

8 Claims, 15 Drawing Sheets

FIG. 14

| BU UNIT NUMBER | COOPERATION CONTROL | CHARGE POWER | LOSS | CHARGER CIRCUIT POWER CONSUMPTION | EFFECTIVE CHARGE POWER |
|---|---|---|---|---|---|
| TWO UNITS | OFF | 200W | 10W | 12W | 176W 200W−(12W×2) |
| THREE UNITS | ON | 210W | 0W | 12W | 174W 210W−(12W×3) |

FIG. 15

| BU UNIT NUMBER | COOPERATION CONTROL | CHARGE POWER | LOSS | CHARGER CIRCUIT POWER CONSUMPTION | EFFECTIVE CHARGE POWER |
|---|---|---|---|---|---|
| TWO UNITS | OFF | 200W | 10W | 8W | 184W 200W−(8W×2) |
| THREE UNITS | ON | 210W | 0W | 8W | 186W 210W−(8W×3) |

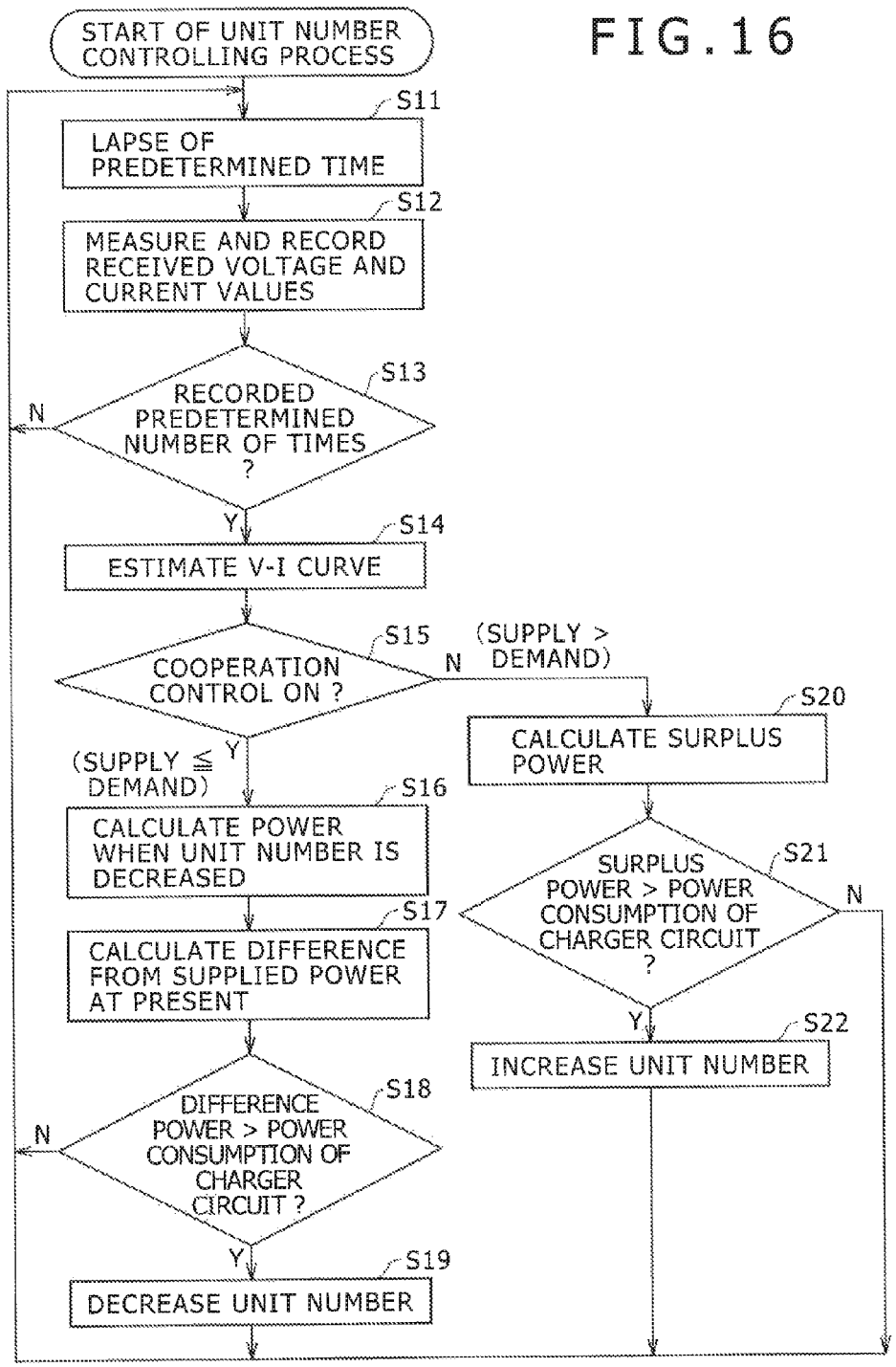

US 9,257,861 B2

CONTROL APPARATUS AND CONTROL METHOD

BACKGROUND

The present disclosure relates to a control apparatus and a control method for carrying out charging control, for example, into a battery unit.

In recent years, in order to enhance the output capacity, a plurality of power supply modules are connected in parallel such that electric power is supplied from each of the power supply modules. For example, Japanese Patent Laid-Open No 2006-034047 discloses a power supply apparatus which includes a plurality of power supply units connected in parallel such that they are started up successively.

SUMMARY

The power supply units of the power supply apparatus disclosed in the document mentioned above generate a voltage from a fixed input, and the power supply apparatus has a problem in that the power supply units cannot be charged.

Therefore, it is desirable to provide a control apparatus and a control method by which charging control into one or a plurality of battery units is carried out.

According to an embodiment of the present disclosure, there is provided a control apparatus including a supplying section to which a voltage which varies in response to a variation of a state is supplied from an electric power generation section, and a control section configured to change the number of battery units, for which charging is to be carried out, in response to a relationship between the voltage and a reference value.

According to another embodiment of the present disclosure, there is provided a control method including supplying a voltage, which varies in response to a variation of a state, from an electric power generation section, and chan ing the number of battery units, for which charging is to be carried out, in response to a relationship between the voltage and a reference value.

With at least one of the embodiments, charging control for one or a plurality of battery units can be carried out efficiently.

BRIEF DESCRIPTION OF THE DRAWINGS

FIG. 95 is a block diagram showing an example of a configuration of a control system wherein cooperation control is carried out by a control unit and a plurality of battery units;

FIGS. 14 and 15 are views illustrating different examples of a second unit number controlling process; and FIG. 16 is a flow chart illustrating an example of a flow of processing of the second unit number controlling process.

DETAILED DESCRIPTION OF THE PREFERRED EMBODIMENT

In the following, an embodiment of the present disclosure is described with reference to the accompanying drawings. It is to be noted that the description is given in the following order.

<1. Embodiment>
<2. Modifications>

It is to be noted that the embodiment and the modifications described below are specific preferred examples of the present disclosure, and the present disclosure is not limited to the embodiment and the modifications.

<1. Embodiment>
[Configuration of the System]

Figure 1:
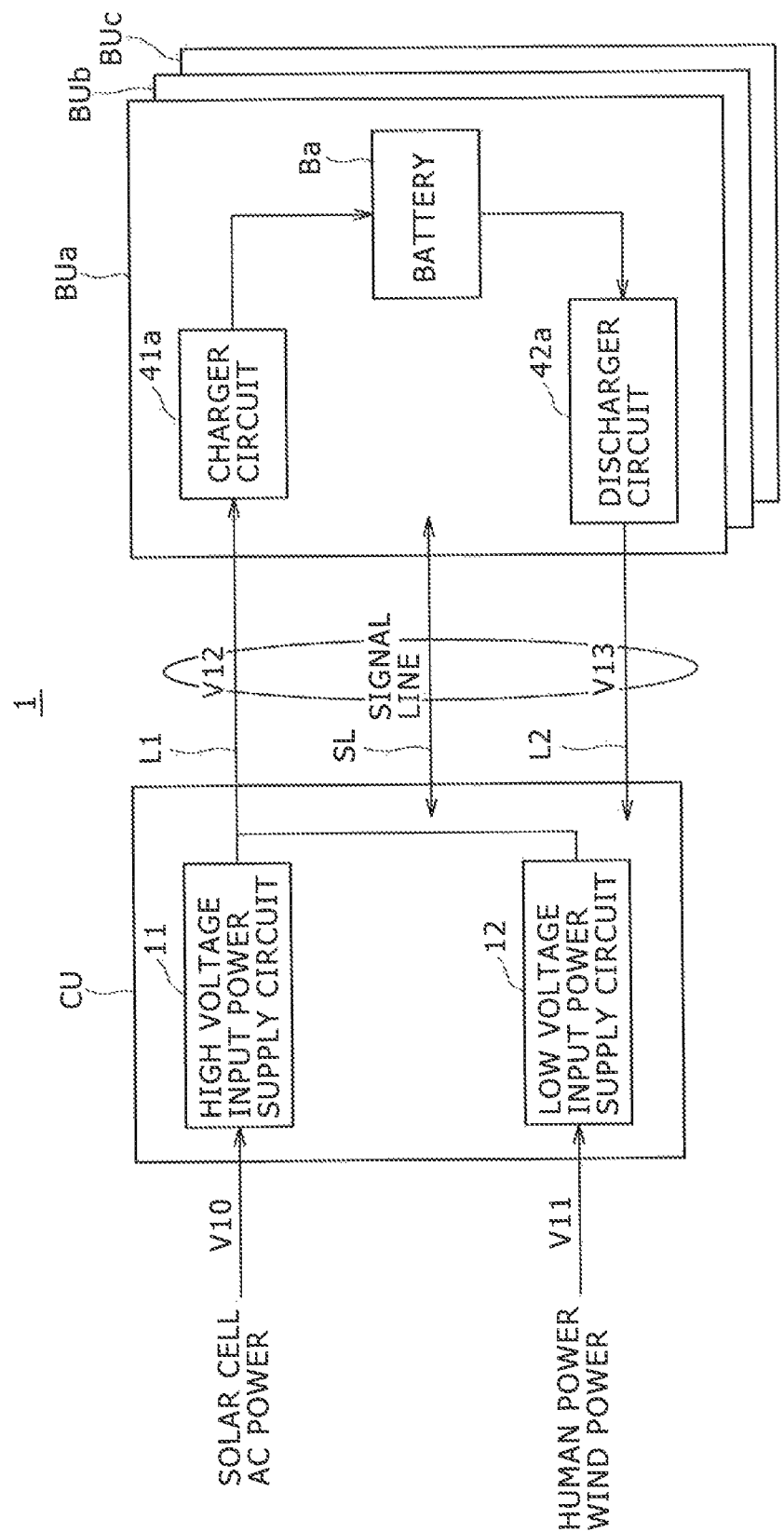
FIG. 1 is a block diagram showing an example of a configuration of a system.

FIG. 1 shows an example of a configuration of a control system according to the present disclosure. The control system is configured from one or a plurality of control units CU and one or a plurality of battery units BU. The control system 1 shown as an example in FIG. 1 includes one control unit CU, and three be units BUa, BUb and BUc. When there is no necessity to distinguish the individual battery units, each battery unit is suitably referred to as battery unit BU.

In the control system 1, it is possible to control the battery units BU independently of each other. Further, the battery units BU can be connected independently of each other in the control system 1. For example, in a state in which the battery unit BUa and the battery unit BUb are connected in the control system 1, the battery unit BUc can be connected newly or additionally in the control system 1. Or, in a state in which the battery units BUa to BUc are connected in the control system 1, it is possible to remove only the battery unit BUb from the control system. 1.

The control unit CU and the battery units BU are individually connected to each other by electric power lines. The power lines include, for example, an electric power line L1 by which electric power is supplied from the control, unit CU to the battery units BU and another electric power line L2 by which electric power is supplied from the battery units BU to the control unit CU. Thus, bidirectional communication is carried out through a signal line SL between the control unit CU and the battery units BU. The communication may be carried out in conformity with such specifications as, for example, the SMBus (System Management Bus) or the UART (Universal Asynchronous Receiver-Transmitter).

The signal line SL is configured from one or a plurality of lines, and a line to be used is defined in accordance with an object thereof. The signal line SL is used commonly, and the battery units BU are connected to the signal line SL. Each battery unit BU analyzes the header part of a control signal transmitted thereto through the signal line SL to decide whether or not the control signal is destined for the battery unit BU itself. By suitably setting the level and so forth of the control signal, a command to the battery unit BU can be transmitted. A response from a battery unit BU to the control unit CU is transmitted also to the other battery units BU. However, the other battery units BU do not operate in response to the transmission of the response. It is to be noted that, while it is assumed that, in the present example, transmission of electric power and communication are carried out by means of wires, they may otherwise be carried out by radio.

[General Configuration of the Control Unit]

The control unit CU is configured from a high voltage input power supply circuit 11 and a low voltage input power supply circuit 12. The control unit CU has one or a plurality of first devices. In the present example, the control unit CU has two first devices, which individually correspond to the high voltage input power supply circuit 11 and the low voltage input power supply circuit 12. It is to be noted that, although the terms "high voltage" and "low voltage" are used herein, the voltages to be inputted to the high voltage input power supply circuit 11 and the low voltage input power supply circuit 12 may be included in the same input range. The input ranges of the voltages which can be accepted by the high voltage input power supply circuit 11 and the low voltage input power supply circuit 12 may overlap with each other.

A voltage generated by an electric power generation section which generates electricity in response to the environment is supplied to the high voltage input power supply circuit 11 and the low voltage input power supply circuit 12. For example, the electric power Generation section is an apparatus which generates electricity by the sunlight or wind power. Meanwhile, the electric power generation section is not limited to that apparatus which generates electricity in response the natural environment. For example, the electric power generation section may be configured as an apparatus which generates electricity by human power. Although an electric generator whose power generation energy fluctuates in response to the environment or the situation is assumed in this manner, also that electric generator whose power generation energy does not fluctuate is applicable. Therefore, as seen in FIG. 1, also AC power can be inputted to the control system 1. It is to be noted that voltages are supplied, from the same electric power generation section or different electric power generation sections to the high voltage input power supply circuit 11 and the low voltage input power supply circuit 12. The voltage or voltages generated by the electric power generation section or sections are an example of a first voltage or voltages.

To the high voltage input, power supply circuit 11, for example, a DC (Direct Current) voltage V10 of approximately 75 to 100 V (volts) generated by photovoltaic power generation is supplied. Alternatively, an AC (Alternating Current) voltage of approximately 100 to 250 V may be supplied to the high voltage input power supply circuit 11. The high voltage input power supply circuit 11 generates a second voltage in response to a fluctuation of the voltage V10 supplied thereto by photovoltaic power generation. For example, the voltage V10 is stepped down by the high voltage input power supply circuit 11 to generate the second voltage. The second voltage is a DC voltage, for example, within a range of 45 to 48 V.

When the voltage V10 is 75 V, the high voltage input power supply circuit 11 converts the voltage V10 into 45 V. However, when the voltage V10 is 100 V, the high voltage input rower supply circuit 11 converts the voltage V10 into 48 V. In response to a variation of the voltage V10 within the range from 75 to 100 V, the high voltage input power supply circuit 11 generates the second voltage such that the second voltage changes substantially linearly within the range from 45 to 48 V. The high voltage input power supply circuit 11 outputs the generated second voltage. It is to be noted that the rate of change of the second voltage need not necessarily be linear, but a feedback circuit may be used such that the output of the high voltage input power supply circuit 11 is used as it is.

To the low voltage input rower supply circuit 12, a DC voltage V11 within a range of 10 to 40 V generated, for example, by electric power generation by wind, or electric power generation by human power is supplied. The low voltage input power supply circuit 12 generates a second voltage in response to a fluctuation of the voltage V11 similarly to the high voltage input power supply circuit 11. The low voltage input power supply circuit 12 steps up the voltage V11, for example, to a DC voltage within the range of 45 to 49 V in response to a change of the voltage V11 within the range from 10 V to 40 V. The stepped up DC voltage is outputted from the low voltage input power supply circuit 12.

Both or one of the output voltages of the high voltage input power supply circuit 11 and the low voltage input power supply circuit 12 is inputted to the battery units BU. In FIG. 1, the DC voltage supplied to the battery units BU is denoted by V12. As described hereinabove, the voltage V12 is, for example, a DC voltage within the range from 45 to 48 V. All or some of the battery units BU are charged by the voltage V12. It is to be noted that a battery unit BU which is discharging is not charged.

A personal computer may be connectable to the control unit CU. For example, a USE (Universal Serial Bus) cable is used to connect the control unit CU and the personal computer to each other. The control unit CU may be controlled using the personal computer.

[General Configuration of the Battery Unit]

A general configuration of a battery unit which is an example of a second apparatus is described. While description is given below taking the battery unit BUa as an example, unless otherwise specified, the battery unit BUb and the battery unit BUc have the same configuration.

The battery unit BUa includes a charger or charging circuit 41a, a discharger or discharging circuit 42a and a battery Ba. Also the other battery units BU include a charger or charging circuit, a discharger or discharging circuit and a battery. In the following description, when there is no necessity to distinguish each battery, it is referred to suitably as battery B.

The charger circuit 41a converts the voltage V12 supplied thereto from the control unit CU into a voltage applicable to the battery Ba. The battery Ba is charged based on the voltage obtained by the conversion. It is to be noted that the charger circuit. 41a chances the charge rate into the battery Ba in response to a fluctuation of the voltage V12.

Electric power outputted from the battery Ba is supplied to the discharger circuit 42a. From the battery Ba, for example, a DC voltage within a range from substantially from 12 to 55 V is outputted. The DC voltage supplied from the battery Ba is converted into a DC voltage V13 by the discharger circuit

42a. The voltage V13 is a DC voltage of, for example, 48 V. The voltage V13 is outputted from the discharger circuit 42a to the control unit CU through the electric power line L2. It is to be noted that the DC voltage outputted from the battery Ba may otherwise be supplied directly to an external apparatus without by way of the discharger circuit 42a.

Each battery B may be a lithium-ion battery, an olivine-type iron phosphate lithium-ion battery, a lead battery or the like. The batteries B of the battery units BU may be those of different battery types from each other. For example, the battery Ba of the battery unit BUa and the battery Bb of the battery unit BUb are configured from a lithium-ion battery and the battery Bc of the battery unit BUc is configured from a lead battery. The number and the connection scheme of battery cells in the batteries B can be changed suitably. A plurality of battery cells may be connected in series or in parallel. Or series connections of a plurality of battery cells may be connected in parallel.

When the battery units discharge, in the case where the load is light, the highest one of the output voltages of the battery units is supplied as the voltage V13 to the electric power line L2. As the load becomes heavier, the outputs of the battery units are combined, and the combined output is supplied to the electric power line L2. The voltage V13 is supplied to the control unit CU through the electric power line L2. The voltage V13 is outputted from an output port of the control unit CU. To the control unit CU, electric power can be supplied in a distributed relationship from the battery units BU. Therefore, the burden on the individual battery units BU can be moderated.

For example, the following use form may be available. The voltage V13 outputted from the battery unit BUa is supplied to an external apparatus through the control unit CU. To the battery unit BUb, the voltage V12 is supplied from the control unit CU, and the battery Bb of the battery unit BUb is charged. The battery unit BUc is used as a redundant power supply. For example, when the remaining capacity of the battery unit BUa drops, the battery unit to be used is changed over from the battery unit BUa to the battery unit BUc and the voltage V13 outputted from the battery unit BUc is supplied to the external apparatus. Naturally, the use form described is an example, and the use form of the control, system 1 is not limited to this specific use form.

[Internal Configuration of the Control Unit]

Figure 2:
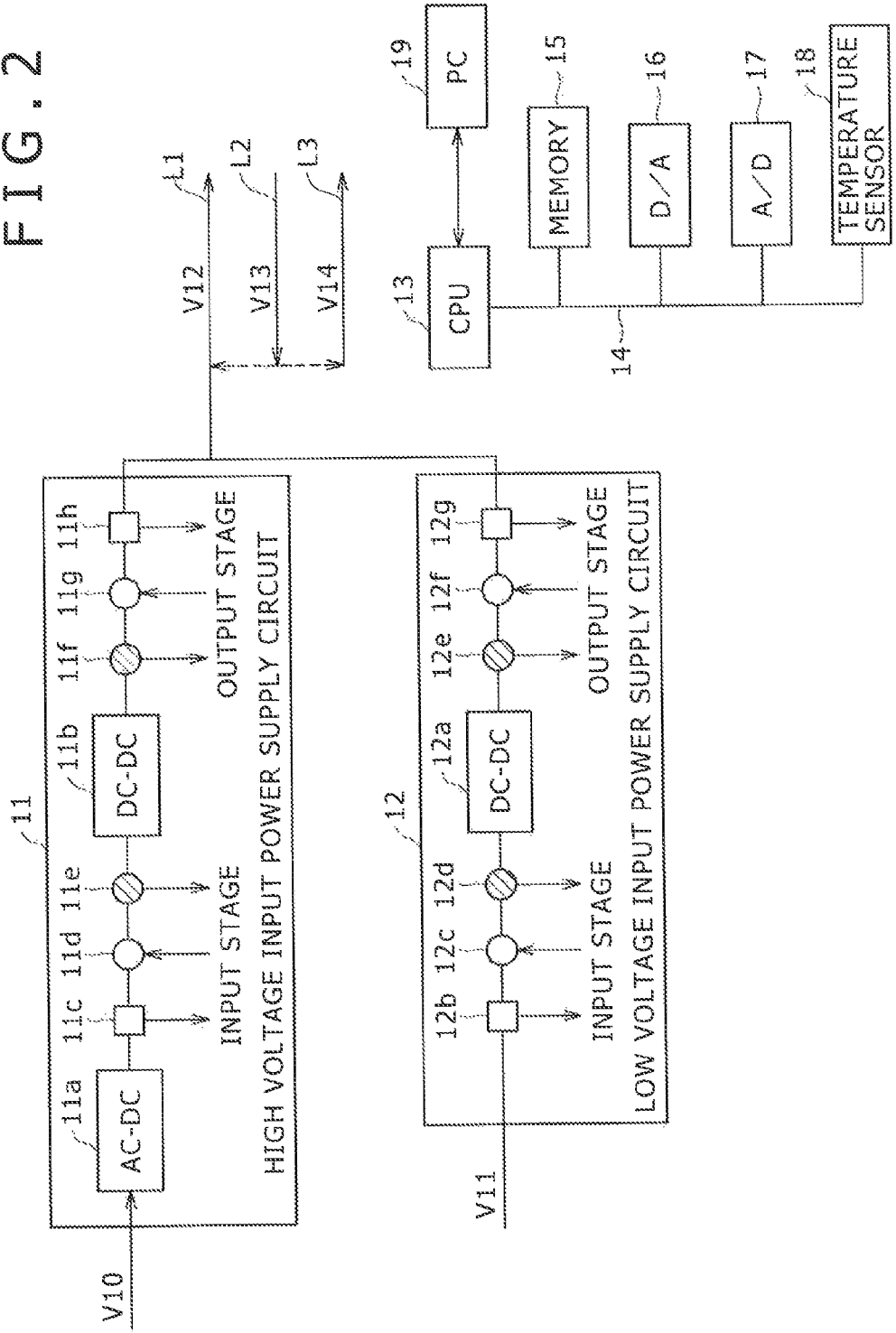
FIG. 2 is a block diagram showing an example of a configuration of a control unit.

FIG. 2 shows an example of an internal configuration of the control unit CU. As described hereinabove, the control unit CU includes the high voltage input power supply circuit 11 and the low voltage input power supply circuit 12. Referring to FIG. 2, the high voltage input power supply circuit 11 includes an AC-DC converter 11 for converting an AC input to a DC output, and a DC-DC converter 11b for stepping down the voltage V10 to a DC voltage within the range from 45 to 48 V. The AC-DC converter 11 and the DC-DC converter 11b may be Those of known types. It is to be noted that, in the case where only a DC voltage is supplied to the high voltage input power supply circuit 11, the AC-DC converter 11 may be omitted.

A voltage sensor, an electronic switch and a current sensor are connected to each of an input stage and an output stage of the DC-DC converter 11b. In FIG. 2 and also in FIG. 5 hereinafter described, the voltage sensor is represented by a square mark; the electronic switch by a round mark; and the current sensor by a round mark with slanting lines individually in a simplified representation. In particular, a voltage sensor 11c, an electronic switch 11d and a current sensor 11e are connected to the input stage of the DC-DC converter 11b. A current sensor 11f, an electronic switch 11g and a voltage sensor 11h are connected to the output stage of the DC-DC converter 11b. Sensor information obtained by the sensors is supplied to a CPU (Central Processing Unit) 13 hereinafter described. On/off operations of the electronic switches are controlled by the CPU 13.

The low voltage input power supply circuit 12 includes a DC-DC converter 12a for stepping up the voltage V11 to a DC voltage within the range from 45 to 48 V. A voltage sensor, an electronic switch and a current sensor are connected to each of an input stage and an output stage of the low voltage input power supply circuit 12. In particular, a voltage sensor 12b, an electronic switch 12c and a current sensor 12d are connected to the input stage of the DC-DC converter 12a. A current sensor 12e, an electronic switch 12f and a voltage sensor 12g are connected to the output stage of the DC-DC converter 12a. Sensor information obtained by the sensors is supplied to the CPU 13. On/off operations of the switches are controlled by the CPU 13.

It is to be noted that, in FIG. 2, an arrow mark extending from a sensor represents that sensor information is supplied to the CPU 13. An arrow mark extending to an electronic switch represents that the electronic switch is controlled by the CPU 13.

An output voltage of the high voltage input power supply circuit 11 is outputted through a diode. An output voltage of the low voltage input power supply circuit 12 is outputted through another diode. The output voltage of the high voltage input power supply circuit 11 and the output voltage of the low voltage input power supply circuit 12 are combined, and the combined voltage V12 is outputted to the battery unit BU through the electric power line L1. The voltage V13 supplied from the battery unit BU is supplied to the control, unit CU through the electric power line L2. Then, the voltage V13 supplied to the control unit CU is supplied to the external, apparatus through an electric power line L3. It is to be noted that, in FIG. 2, the voltage supplied to the external apparatus is represented as voltage V14.

The electric power line L3 may be connected to the battery units BU. By this configuration, for example, a voltage outputted from the battery unit BUa is supplied to the control unit CU through the electric power line P2. The supplied voltage is supplied to the battery unit BUb through the electric power line L3 and can charge the battery unit BUb. It is to be noted that, though not shown, power supplied to the control unit CU through the electric power line L2 may be supplied to the electric power line L1.

The control unit CU includes the CPU 13. The CPU 13 controls the components of the control unit CU. For example, the CPU 13 switches on/off the electronic switches of the high voltage input power supply circuit 11 and the low voltage input power supply circuit 12. Further, the CPU 13 supplies control signals to the battery units BU. The CPU 13 supplies to the battery units BU a control signal for turning on the power supply to the battery units BU or a control signal for instructing the battery units BU to charge or discharge. The CPU 13 can output control signals of different contents to the individual battery units BU.

The CPU 13 is connected to a memory 15, a D/A (Digital to Analog) conversion section 16, an A/D (Analog to Digital) conversion section 17 and a temperature sensor 18 through a bus 14. The bus 14 is configured, for example, from an I$^2$C bus. The memory 15 is configured from a nonvolatile memory such as an EEPROM (Electrically Erasable and Programmable Read Only Memory). The D/A conversion section 16 converts digital signals used in various processes into analog signals.

The CPU 13 receives sensor information measured by the voltage sensors and the current sensors. The sensor information is inputted to the CPU 13 after it is converted into digital signals by the A/D conversion section 17. The temperature sensor 18 measures an environmental temperature. For example, the temperature sensor 18 measures a temperature in the inside of the control unit CU or a temperature around the control unit CU.

The CPU 13 may have a communication function. For example, the CPU 13 and a personal computer (PC) 19 may communicate with each other. The CPU 13 may communicate not only with the personal computer but also with an apparatus connected to a network such as the Internet.

[Power Supply System of the Control Unit]

Figure 3:
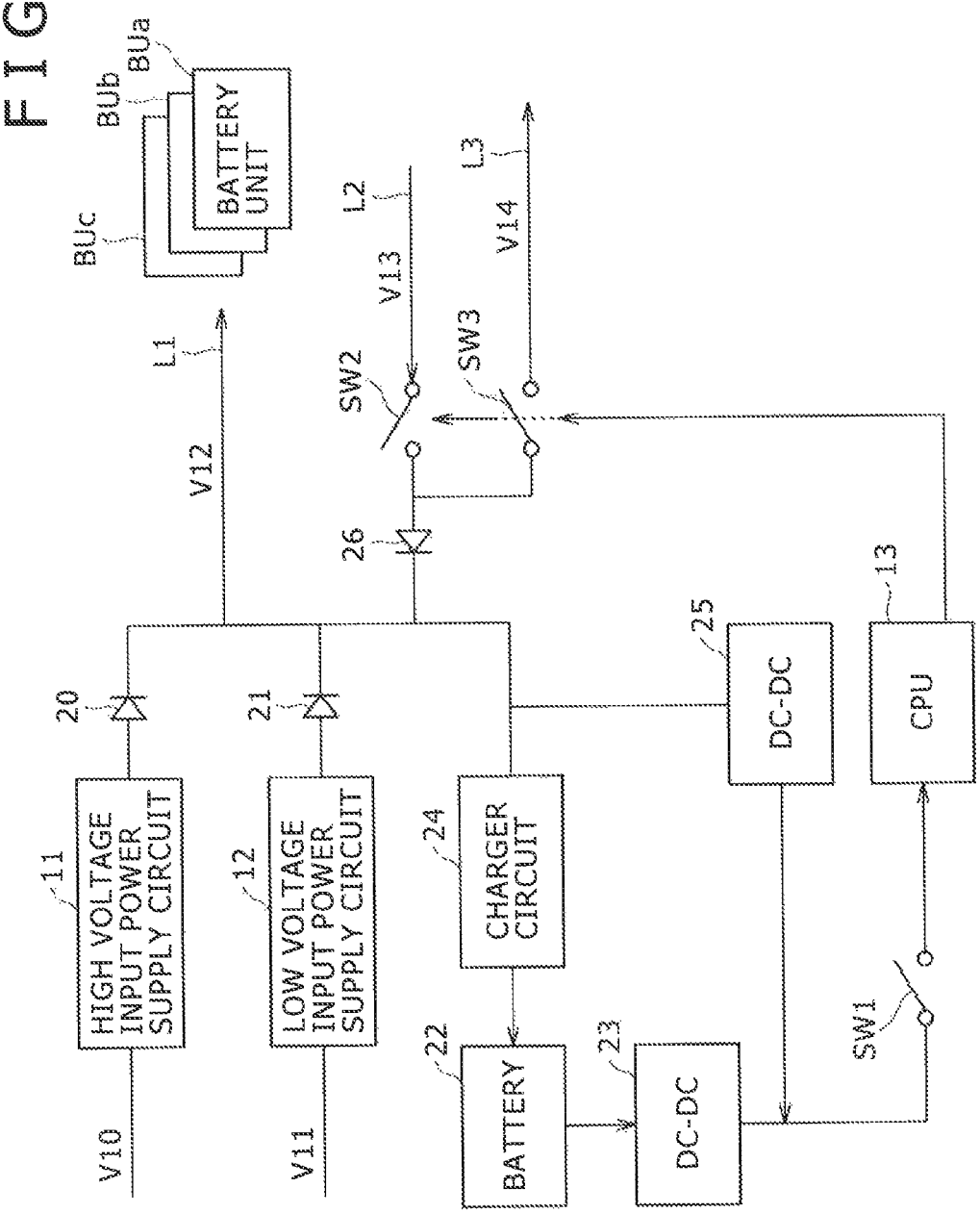
FIG. 3 is a block diagram showing an example of a configuration of a power supply system of the control unit.

FIG. 3 principally shows an example of a configuration of the control unit CU which relates to a power supply system. A diode 20 for the backflow prevention is connected to the output stage of the high voltage input power supply circuit 11. Another diode 21 for the backflow prevention is connected to the output stage of the low voltage input power supply circuit 12. The high voltage input power supply circuit 11 and the to voltage input power supply circuit 12 are connected to each other by OR connection by the diode 20 and the diode 21. Outputs of the high voltage input power supply circuit 11 and the low voltage input power supply circuit 12 are combined and supplied to the battery unit BU. Actually, that one of the outputs of the high voltage input power supply circuit. 11 and the low voltage input power supply circuit 12 which exhibits a higher voltage is supplied to the battery unit BU. However, also a situation in which the electric power from both of the high voltage input power supply circuit 11 and the low voltage input power supply circuit 12 is supplied is entered in response to the power consumption of the battery unit BU which serves as a load.

The control unit CU includes a main switch SW1 which can be operated by a user. When the main switch SW1 is switched on, electric power is supplied to the CPU 13 to start up the control unit CU. The electric power is supplied to the CPU 13, for example, from a battery 22 built in the control unit CU. The battery 22 is a rechargeable battery such as a lithium-ion battery. A DC voltage from the battery 22 is converted into a voltage, with which the CPU 13 operates, by a DC-DC converter 23. The voltage obtained by the conversion is supplied as a power supply voltage to the CPU 13. In this manner, upon start-up of the control unit CU, the battery 22 is used. The battery 22 is controlled, for example, by the CPU 13.

The battery 22 can be charged by electric power supplied from the high voltage input power supply circuit 11 or the low voltage input, power supply circuit 12 or otherwise from the battery units BU. Electric power supplied from the battery units BU is supplied to a charger circuit 24. The charger circuit 24 includes a DC-DC converter. The voltage V13 supplied from the battery units BU is converted into a DC voltage of a predetermined level by the charger circuit 24. The DC voltage obtained by the conversion is supplied to the battery 22. The battery 22 is charged by the DC voltage supplied thereto.

It is to be noted that the CPU 13 may operate with the voltage V13 supplied thereto from the high voltage input power supply circuit 11, low voltage input power supply circuit 12 or battery units BU. The voltage V13 supplied from the battery units BU is converted into a voltage of a predetermined level by a DC-DC converter 25. The voltage obtained by the conversion is supplied as a power supply voltage to the CPU 13 so that the CPU 13 operates.

After the control unit CU is started up, if at least one of the voltages V10 and V11 is inputted, then the voltage V12 is generated. The voltage V12 is supplied to the battery units BU through the electric power line L1. At this time, the CPU 13 uses the signal line SL to communicate with the batter's units BU. By this communication, the CPU 13 outputs a control signal for instructing the battery units BU to start up and discharge. Then, the CPU 13 switches on a switch SW2. The switch SW2 is configured, for example, from an FET (Field Effect Transistor). Or the switch SW2 may be configured from an IGBT (Insulated Gate Bipolar Transistor). When the switch SW2 is on, the voltage V13 is supplied from the battery units BU to the control unit CU.

A diode 26 for the backflow prevention is connected to the output side of the switch SW2. The connection of the diode 26 can prevent unstable electric power, which is supplied from a solar battery or a wind power generation source, from being supplied directly to the external apparatus. Thus, stabilized electric power supplied from the battery units BU can be supplied to the external apparatus. Naturally, a diode may be provided on the final stage of the battery units BU in order to secure the safety.

In order to supply the electric power supplied from the battery units BU to the external apparatus, the CPU 13 switches on a switch SW3. When the switch SW3 is switched on, the voltage V14 based on the voltage V13 is supplied to the external apparatus through the electric power line P3. It is to be noted that the voltage V14 may be supplied to the other battery units BU so that the batteries B of the other battery units BU are charged by the voltage V14.

[Example of the Configuration of the High Voltage Input Power Supply Circuit]

Figure 4:
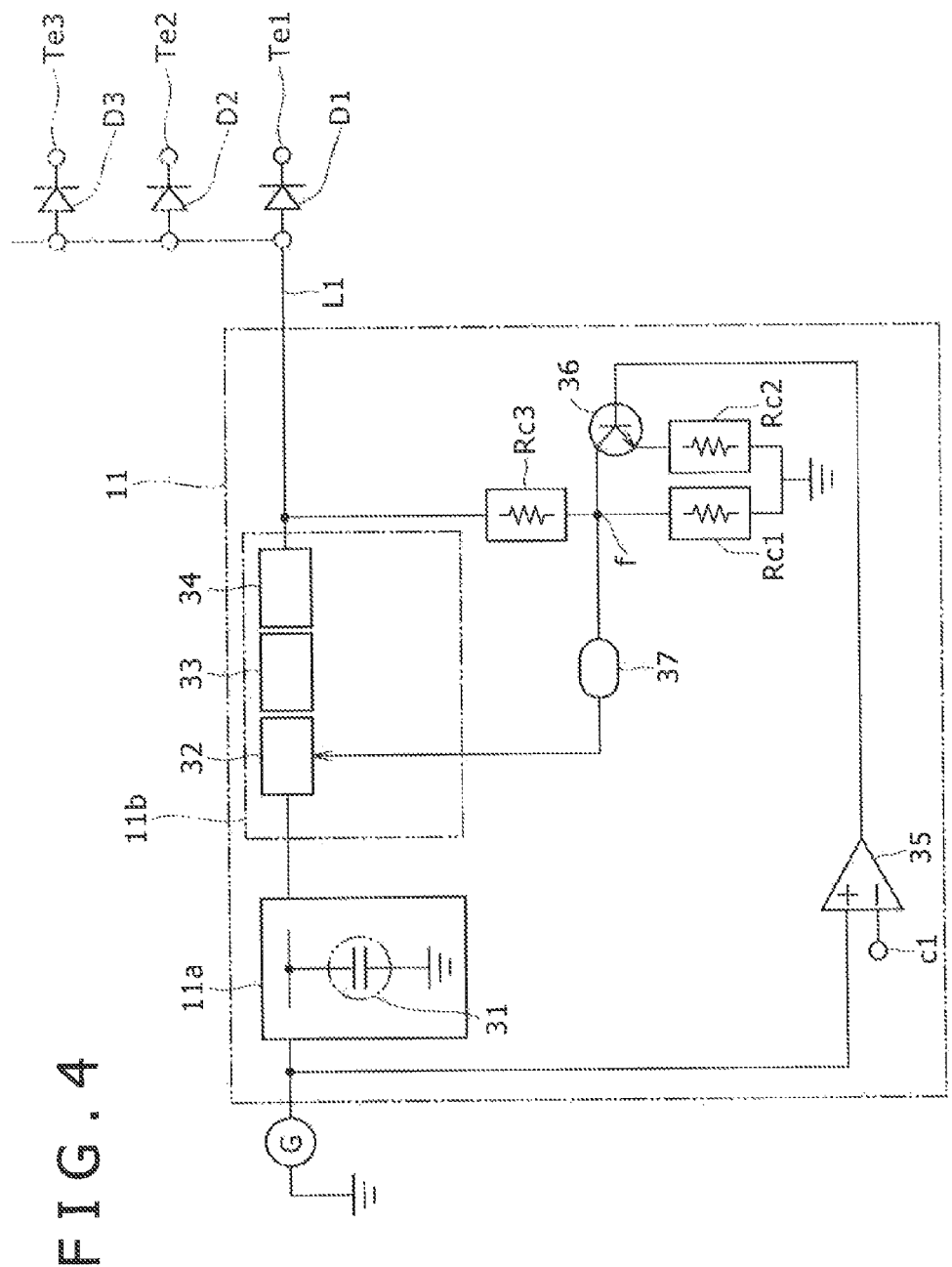
FIG. 4 is a circuit diagram showing an example of a particular configuration of a high voltage input power supply circuit of the control unit.

FIG. 4 shows an example of a particular configuration of the high voltage input power supply circuit. Referring to FIG. 14, the high voltage input power supply circuit 11 includes the DC-DC converter 11b and a feedforward controlling system hereinafter described. In FIG. 4, the voltage sensor 11c, electronic switch 11d, current sensor 11e, current sensor 11f, electronic switch 11g and voltage sensor 11h as well as the diode 20 and so forth are not shown.

The low voltage input power supply circuit 12 is configured substantially similarly to the high voltage input power supply circuit 11 except that the DC-DC converter 12a is that of the step-up type.

The DC-DC converter 11b is configured from a primary side circuit 32 including, for example, a switching element, a transformer 33, and a secondary side circuit 34 including a rectification element and so forth. The DC-DC converter 11b shown in FIG. 4 is that of the current resonance type, namely, an LLC resonance converter.

The feedforward controlling system includes an operational amplifier 35, a transistor 36 and resistors Rc1, Rc2 and Rc3. An output of the feedforward controlling system is inputted to a controlling terminal provided on a driver of the primary side circuit 32 of the DC-DC converter 11b. The DC-DC converter 11b adjusts the output voltage from the high voltage input power supply circuit 11 so that the input voltage to the controlling terminal may be fixed.

Since the high voltage input power supply circuit 11 includes the feedforward controlling system, the output voltage from the high voltage input power supply circuit 11 is adjusted so that the value thereof may become a voltage value within a range set in advance. Accordingly, the control unit CU including the high voltage input power supply circuit 11 has a function of a voltage conversion apparatus which varies the output voltage, for example, in response to a change of the Input voltage from a solar cell, or the like.

As seen in FIG. 4, an output voltage is extracted from the high voltage input power supply circuit 11 through the AC-DC converter 11 including a capacitor 31, primary side circuit 32, transformer 33 and secondary side circuit 34. The AC-DC converter 11 is a power factor correction circuit disposed where the input to the control unit CU from the outsiders an AC power supply.

The output from the control unit CU is sent to the battery units BU through the electric power line L1. For example, the individual battery units BUa, BUb and BUc are connected to output terminals Te1, Te2, Te3, . . . through diodes D1, D2, D3, . . . for the backflow prevention, respectively.

In the following, the feedforward controlling system provided in the high voltage input power supply circuit 11 is described.

A voltage obtained by stepping down the input voltage to the high voltage input power supply circuit 11 to kc times, where kc is approximately one several tenth or one hundredth, is inputted to the non-negated input terminal of the operational amplifier 35. Meanwhile, to the negated input terminal c1 of the operational amplifier 35, a voltage obtained by stepping down a fixed voltage $Vt_0$ determined in advance to kc times is inputted. The input voltage $kc \times Vt_0$ to the negated input terminal c1 of the operational amplifier 35 is applied, for example, from the D/A conversion section 16. The value of the voltage $Vt_0$ is retained in a built-in memory of the D/A conversion section 16 and can be changed as occasion demands. The value of the voltage $Vt_0$ may otherwise be retained into the memory 15 connected to the CPU 13 through the bus 14 such that it is transferred to the D/A conversion section 16.

The output terminal of the operational amplifier 35 is connected to the base of the transistor 36, and voltage-current conversion is carried out in response to the difference between the input voltage to the non-negated input terminal and the input voltage to the negated input terminal of the operational amplifier 35 by the transistor 36.

The resistance value of the resistor Rc2 connected to the emitter of the transistor 36 is higher than the resistance value of the resistor Rc1 connected in parallel to the resistor Rc2.

It is assumed that, for example, the input voltage to the rich voltage input power supply circuit 11 is sufficiently higher than the fixed voltage $Vt_0$ determined in advance. At this time, since the transistor 36 is in an on state, and the value of the combined resistance of the resistor Rc1 and the resistor Rc2 is lower than the resistance value of the resistor Rc1, the potential at a point f shown in FIG. 4 approaches the ground potential.

Consequently, the input voltage to the controlling terminal provided on the driver of the primary side circuit 32 and connected to the point f through a photo-coupler 37 drops. The DC-DC converter 11b which detects the drop of the input voltage to the controlling terminal steps up the output voltage from the high voltage input power supply circuit 11 so that the input voltage to the controlling terminal may be fixed.

It is assumed now that, for example, the terminal voltage of the solar cell connected to the control unit CU drops conversely and the input voltage to the high voltage input power supply circuit 11 approaches the fixed voltage $Vt_0$ determined advance.

As the input voltage to the high voltage input power supply circuit 11 drops, the state of the transistor 36 approaches an off state from an on state. As the state of the transistor 36 approaches an off state from an on state, current becomes less likely to flow to the resistor Rc1 and the resistor Rc2, and the potential at the point f shown in FIG. 4 rises.

Consequently, the input voltage to the controlling terminal provided on the driver of the primary side circuit 32 is brought out of a state in which it is kept fixed. Therefore, the DC-DC converter 11b steps down the output voltage from the high voltage input power supply circuit 11 so that the input voltage to the controlling terminal may be fixed.

In other words, in the case where the input voltage is sufficiently higher than the fixed voltage $Vt_0$ determined advance, the high voltage input power supply circuit 11 steps up the output voltage. On the other hand, if the terminal voltage of the solar cell drops and the input voltage approaches the fixed voltage $Vt_0$ determined in advance, then the high voltage input power supply circuit 11 steps down the output voltage. In this manner, the control unit CU including the high voltage input power supply circuit 11 dynamically changes the output voltage in response to the magnitude of the input voltage.

Furthermore, as hereinafter described, the high voltage input power supply circuit 11 dynamically changes the output voltage also in response to a change of the voltage required on the output side of the control unit CU.

For example, it is assumed that the number of those battery units BU which are electrically connected to the control unit CU increases during electric generation of the solar cell. In other words, it is assumed that the load as viewed from the solar cell increases during electric generation of the solar cell.

In this instance, a battery unit BU is electrically connected additionally to the control unit CU, and consequently, the terminal voltage of the solar cell connected to the control unit CU drops. Then, when the input voltage to the high voltage input power supply circuit 11 drops, the state of the transistor 36 approaches an off state from an on state, and the output voltage from the high voltage input power supply circuit 11 is stepped down.

On the other hand, if it is assumed chat the number of those battery units BU which are electrically connected to the control unit CU decreases during electric generation of the solar cell, then the load as viewed from the solar cell decreases. Consequently, the terminal voltage of the solar cell connected to the control unit CU rises. If the input voltage to the high voltage input power supply circuit 11 becomes sufficiently higher than the fixed voltage $Vt_0$ determined in advance, then the input voltage to the controlling terminal provided on the driver of the primary side circuit 32 drops. Consequently, the output voltage from the high voltage input power supply circuit 11 is stepped up.

It is to be noted that the resistance values of the resistors Rc1, Rc2 and Rc3 are selected suitably such that the value of the output voltage of the high voltage input power supply circuit 11 may be included in a range set in advance. In other words, the upper limit to the output voltage from the high voltage input power supply circuit 11 is determined by the resistance values of the resistors Rc1 and Rc2. The transistor 36 is disposed so that, when the input voltage to the high voltage input power supply circuit 11 is higher than the predetermined value, the value of the output voltage from the high voltage input, power supply circuit 11 may not exceed the voltage value of the upper limit set in advance.

On the other hand, the lower limit to the output voltage from the high voltage input power supply circuit 11 is determined by the input voltage to the non-negated input terminal of an operational amplifier of a feedforward controlling system of the charger circuit 41a as hereinafter described.

[Internal Configuration of the Battery Unit]

Figure 5:
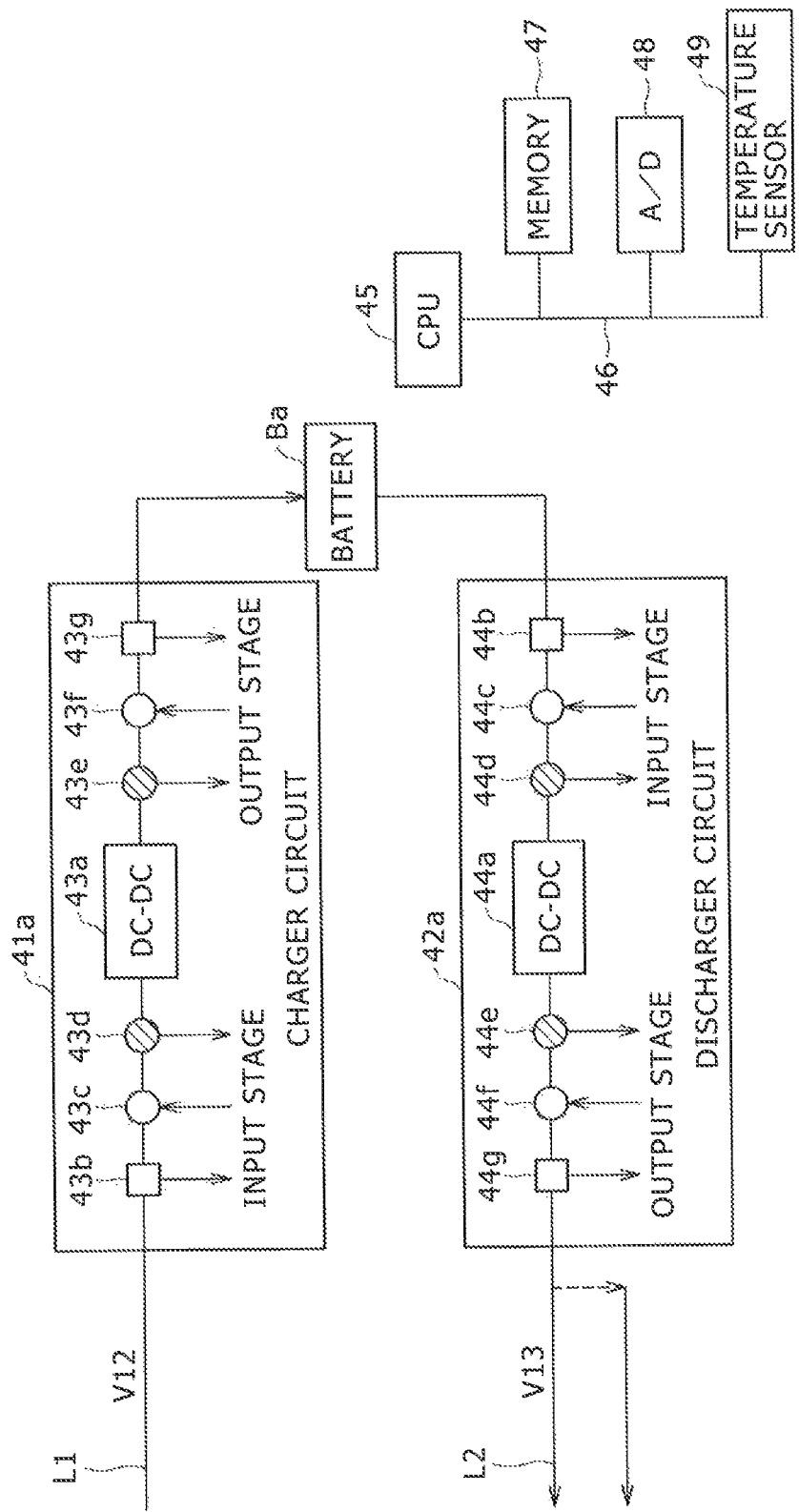
FIG. 5 is a block diagram showing an example of a configuration of a battery unit.

FIG. 5 shows an example of an internal configuration of the battery units BC. Here, description is given taking the battery unit BUa as an example. Unless otherwise specified, the battery unit BUb and the battery unit BUc have a configuration similar to that of the battery unit BUa.

Referring to FIG. 5, the battery unit BUa includes a charger circuit 41a, a discharger circuit 42a and a battery Ba. The voltage V12 is supplied from the control unit CU to the charger circuit 41a. The voltage V13 which is an output from the battery unit BUa is supplied to the control unit CU through the discharger circuit 42a. The voltage V13 may otherwise be supplied directly to the external, apparatus from the discharger circuit 42a.

The charger circuit 41a includes a DC-DC converter 43a. The voltage V12 inputted to the charger circuit 41a is converted into a predetermined voltage by the DC-DC converter 43a. The predetermined voltage obtained by the conversion is supplied to the battery Ba to charge the battery Ba. The predetermined voltage differs depending upon the type and so forth of the battery Ba. To the input stage of the DC-DC converter 43a, a voltage sensor 43b, an electronic switch 43c and a current sensor 43d are connected. To the output stage of the DC-DC converter 43a, a current sensor 43e, an electronic switch 43f and a voltage sensor 43g are connected.

The discharger circuit 42a includes a DC-DC converter 44a. The DC voltage supplied from the battery Ba to the discharger circuit 42a is converted into the voltage V13 by the DC-DC converter 44a. The voltage V13 obtained by the conversion is outputted from the discharger circuit 42a. To the input stage of the DC-DC converter 44a, a voltage sensor 44b, an electronic switch 44c and a current sensor 44d are connected. To the output stage of the DC-DC converter 44a, a current sensor 44e, an electronic switch 44f and a voltage sensor 44g are connected.

The battery unit BUa includes a CPU 45. The CPU 45 controls the components of the battery unit BU. For example, the CPU 45 controls on/off operations of the electronic switches. The CPU 45 may carry out processes for assuring the safety of the battery B such as an overcharge preventing function and an excessive current preventing function. The CPU 45 is connected to a bus 46. The bus 46 may be, for example, an I²C bus.

To the bus 46, a memory 47, an A/D conversion section 48 and a temperature sensor 49 are connected. The memory 47 is a rewritable nonvolatile memory such as, for example, an EEPROM. The A/D conversion section 48 converts analog sensor information obtained by the voltage sensors and the current sensors into digital information. The sensor information converted into digital signals by the A/D conversion section 48 is supplied to the CPU 45. The temperature sensor 49 measures the temperature at a predetermined place in the battery unit BU. Particularly, the temperature sensor 49 measures, for example, the temperature of the periphery of a circuit hoard on which the CPU 45 is mounted, the temperature of the charger circuit 41a and the discharger circuit 42a and the temperature of the battery Ba.

[Power Supply System of the Battery Unit]

Figure 6:
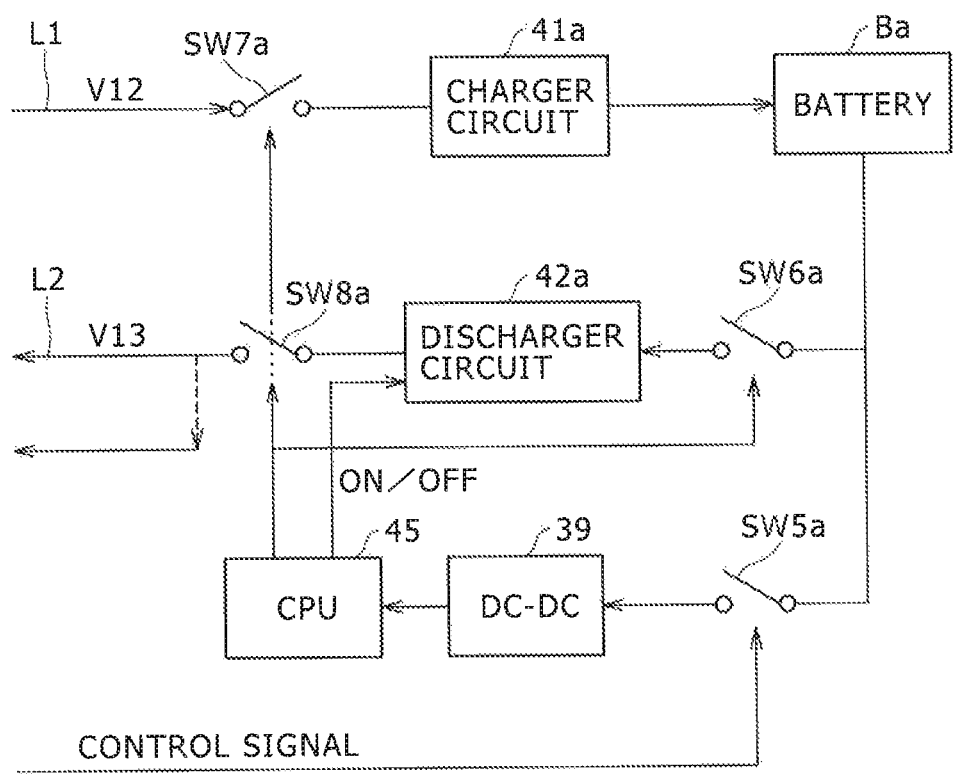
FIG. 6 is it block diagram showing an example of a configuration of a power supply system of the battery unit.

FIG. 6 shows an example of a configuration of the battery unit BUa principally relating to a power supply system. Referring to FIG. 6, the battery unit BUa does not include a main switch. A switch SW5 and a DC-DC converter 39 are connected between the battery Ba and the CPU 45. Another switch SW6 is connected between the battery Ba and the discharger circuit 42a. A further switch SW7 is connected to the input stage of the charger circuit 41a. A still further switch SW8 is connected to the output stage of the discharger circuit 42a. The switches SW are configured, for example, from an FET.

The battery unit BUa is started up, for example, by a control signal from the control unit CU. A control signal, for example, of the high level is normally supplied from the control unit CU to the battery unit BUa through a predetermined signal line. Therefore, only by connecting a port of the battery unit BUa to the predetermined signal line, the control signal of the high level is supplied to the switch SW5 making the switch SW5 in an on state to start up the battery unit BUa. When the switch SW5 is on, a DC voltage from the battery Ba is supplied to the DC-DC converter 39. A power supply voltage for operating the CPU 45 is generated by the DC-DC converter 39. The generated power supply voltage is supplied to the CPU 45 to operate the CPU 45.

The CPU 45 executes control in accordance with an instruction of the control unit CU. For example, a control signal for the instruction to charge is supplied from the control unit CU to the CPU 45. In response to the instruction to charge, the CPU 45 switches off the switch SW6 and the switch SW3 and then switches on the switch SW7. When the switch SW7 is on, the voltage V12 supplied from the control unit CU is supplied to the charger circuit 41a. The voltage V12 is converted into a predetermined voltage nay the charger circuit 41a, and the battery Ba is charged by the predetermined voltage obtained by the conversion. It is to be noted that the charging method into the battery B can be changed suitably in response to the type of the battery B.

For example, a control signal for the instruction to discharge is supplied from the control unit CU to the CPU 45. In response to the instruction to discharge, the CPU 45 switches off the switch SW7 and switches on the switches SW6 and SW8. For example, the switch SW8 is switched on after a fixed interval of time after the switch SW6 is switched on. When the switch SW6 is on, the DC voltage from the battery Ba is supplied to the discharger circuit 42a. The DC voltage from the battery Ba is converted into the voltage V13 by the discharger circuit 42a. The voltage V13 obtained by the conversion is supplied to the control unit CU through the switch 5W8. It is to be noted that, though not shown, a diode may be added to a succeeding stage to the switch SW8 in order to prevent the output of the switch SW8 from interfering with the output from a different one of the battery units BU.

It is to be noted that the discharger circuit 42a can be changed over between on and off by control of the CPU 45. In this instance, an ON/OFF signal line extending from the CPU 45 to the discharger circuit 42a is used. For example, a switch SW not shown is provided on the output side of the switch SW6. The switch SW in this instance is hereinafter referred to as switch SW10 taking the convenience in description into consideration. The switch SW10 carries out changeover between a first path which passes the discharger circuit 42a and a second path which does not pass the discharger circuit 42a.

In order to turn on the discharger circuit 42a, the CPU 45 connects the switch SWIG to the first path. Consequently, an output from the switch. SW6 is supplied to the switch SW8 through the discharger circuit 42a. In order to turn off the discharger circuit 42a, the CPU 45 connects the switch SW10 to the second path. Consequently, the cutout from the switch SW6 is supplied directly to the switch SW8 without by way of the discharger circuit 42a.

[Example of the Configuration of the Charger Circuit]

Figure 7:
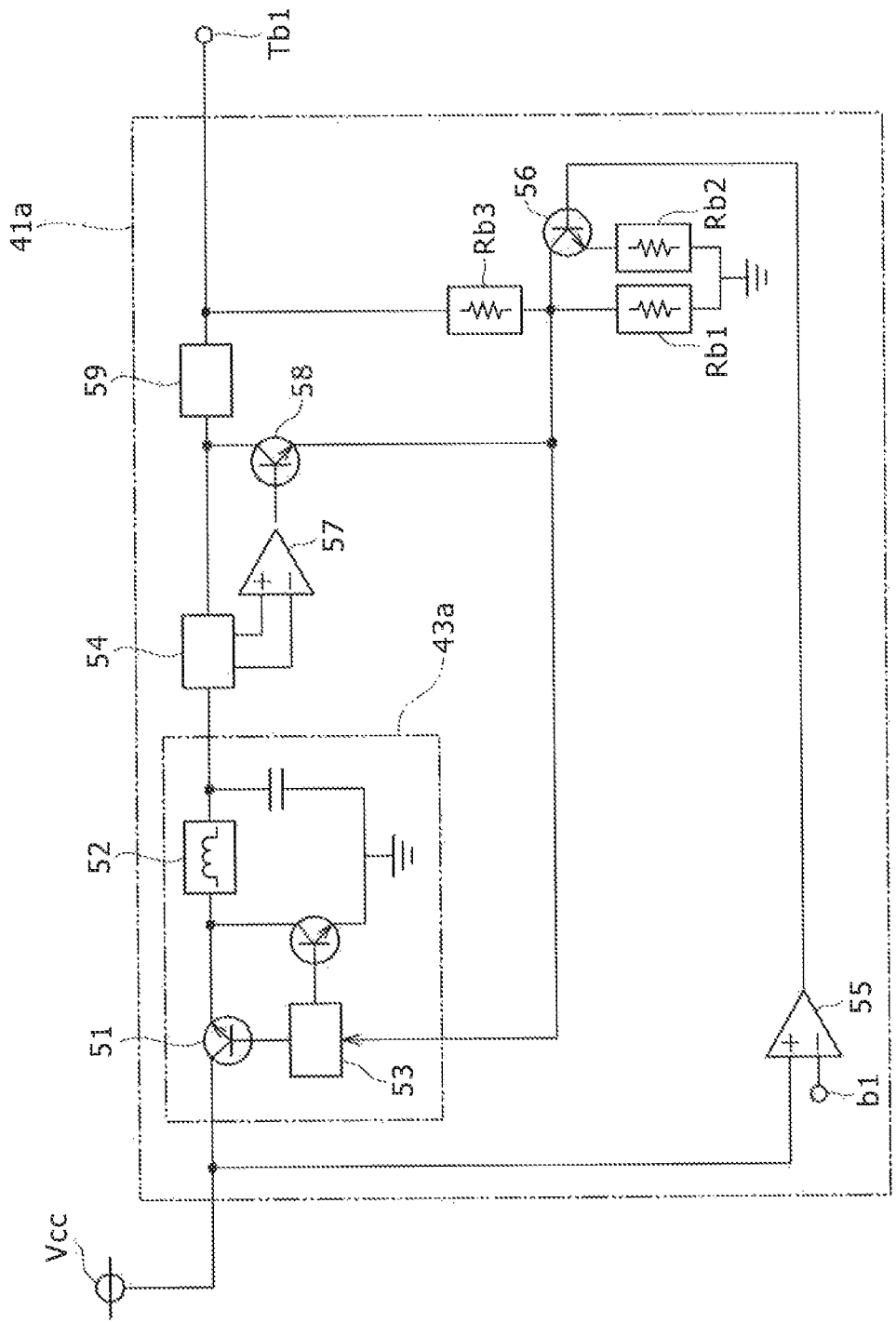
FIG. 7 is a circuit diagram showing an example of a particular configuration of a charger circuit of the battery unit.

FIG. 7 shows an example of a particular configuration of the charger circuit of the battery unit. Referring to FIG. 7, the charger circuit 41a includes a DC-DC converter 43a, and a feedforward controlling system and a feedback controlling system hereinafter described. It is to be noted that in FIG. 7, the voltage sensor 43b, electronic switch 43c, current sensor 43d, current sensor 43e, electronic switch 43f, voltage sensor 43g, switch SW7 and so forth are not shown.

Also the charger circuits of the battery units BU have a configuration substantially similar to that of the charger circuit 41a shown in FIG. 7.

The DC-DC converter 43a is configured, for example, from a transistor 51, a coil 52, a controlling IC (Integrated Circuit) 53 and so forth. The transistor 51 is controlled by the controlling IC 53.

The feedforward controlling system includes an operational amplifier 55, a transistor 56, and resistors Rb1, Rb2 and Rb3 similarly to the high voltage input power supply circuit 11. An output of the feedforward controlling system is inputted, for example, to a controlling terminal provided on the controlling IC 53 of the DC-DC converter 43a. The controlling IC 53 in the DC-DC converter 43a adjusts the output voltage from the charger circuit 41a so that the input voltage to the controlling terminal may be fixed.

In other words, the feedforward controlling system provided in the charger circuit 41a acts similarly to the feedforward controlling system provided in the high voltage input power supply circuit 11.

Since the charger circuit 41a includes the feedforward controlling system, the output voltage from the charger circuit 41a is adjusted so that the value thereof may become a voltage value within a range set in advance. Since the value of the output voltage from the charger circuit is adjusted to a voltage value within the range set in advance, the charging current to the batteries B electrically connected to the control unit CU is adjusted in response to a change of the input voltage from the high voltage input power supply circuit 11. Accordingly, the battery units BU which include the charger circuit have a function of a charging apparatus which changes the charge rate to the batteries B.

Since the charge rate to the batteries B electrically connected to the control unit CU is changed, the value of the input voltage to the charger circuits of the battery units BU, or in other words, the value of the output voltage of the high voltage input power supply circuit 11 or the low voltage moot power supply circuit 12, is adjusted so as to become a voltage value within the range set in advance.

The input to the charger circuit 41a is an output, for example, from the high voltage input power supply circuit 11 or the low voltage input power supply circuit 12 of the control, unit CU described hereinabove. Accordingly, one of the output terminals Te1, Te2, Te3, ... shown in FIG. 4 and the input terminal of the charger circuit 41a are connected to each other.

As seen in FIG. 7, an output voltage from the charger circuit. 41a is extracted through the DG-DC converter 43a, a current sensor 54 and a filter 59. The battery Ba is connected to a terminal Tb1 of the charger circuit 41a. In other words, the output from the charger circuit 41a is used as an input to the battery Ba.

As hereinafter described, the value of the output voltage from each charger circuit is adjusted so as to become a voltage value within the range set in advance in response to the type of the battery connected to the charger circuit. The range of the output voltage from each charger circuit is adjusted by suitably selecting the resistance value of the resistors Rb1, Rb2 and Rb3.

Since the range of the output voltage from each charger circuit is determined individually in response to the type of the battery connected to the charger circuit, the type of the batteries B provided in the battery units BU is not limited specifically. This is because the resistance values of the resistors Rb1, Rb2 and Rb3 in the charger circuits may be suitably selected in response to the type of the batteries B connected thereto.

It is to be noted that, while the configuration wherein the output of the feedforward controlling system is inputted to the controlling terminal of the controlling IC 53 is shown in FIG. 7, the CPU 45 of the battery units BU may supply an input to toe controlling terminal of the controlling IC 53. For example, the CPU 45 of the battery unit BU may acquire information relating to the input voltage to the battery unit BU from the CPU 13 of the control unit CU through the signal line SL. The CPU 13 of the control unit CU can acquire information relating to the input voltage to the battery unit BU from a result of measurement of the voltage sensor 11h or the voltage sensor 12g.

In the following, the feedforward controlling system provided in the charger circuit 41a is described.

The input to the non-negated input terminal of the operational amplifier 55 is a voltage obtained by stepping down the input voltage to the charger circuit 41a to kb times, where kb is approximately one several tenth to one hundredth. Meanwhile, the input to the negated input terminal b1 of the operational amplifier 55 is a voltage obtained by stepping down a voltage Vb, which is to be set as a lower limit to the output voltage from the high voltage input power supply circuit 11 or the low voltage input power supply circuit 12, to kb times. The input voltage kb×Vb to the negated input terminal b1 of the operational amplifier 55 is applied, for example, from the CPU 45.

Accordingly, the feedforward controlling system provided in the charger circuit 41a steps up the output voltage from the charger circuit 41a when the input voltage to the charger circuit 41a is sufficiently higher than the fixed voltage Vb determined in advance. Then, when the input voltage to the charger circuit 41a approaches the fixed voltage Vb determined in advance, the feedforward controlling system steps down the output voltage from the charger circuit 41a.

The transistor 56 is disposed so that, when the input, voltage to the charger circuit 41a is higher than the predetermined value, the value of the output voltage from the charger circuit 41a may not exceed an upper limit set in advance similarly to the transistor 36 described hereinabove with reference to FIG. 4. It is to be noted that the range of the value of the output voltage from the charger circuit 41a depends upon the combination of the resistance values of the resistors Rb1, Rb2 and Rb3. Therefore, the resistance values of the resistors Rb1, Rb2 and Rb3 are adjusted in response to the type of the batteries B connected to the charger circuits.

Further, the charger circuit 41a includes also the feedback controlling system as described hereinabove. The feedback controlling system is configured, for example, from a current sensor 54, an operational amplifier 57, a transistor 58 and so forth.

If the current amount supplied to the battery Ba exceeds a prescribed value set in advance, then the output voltage from the charger circuit 41a is stepped down by the feedback controlling system, and the current amount supplied to the battery Ba is limited. The degree of the limitation to the current amount to be supplied to the battery Ba is determined in accordance with a rated value of the battery B connected to each charger circuit.

If the output voltage from the charger circuit 41a is stepped down by the feedforward controlling system or the feedback controlling system, then the current amount to be supplied to the battery Ba is limited. When the current amount supplied to the battery Ba is limited, as a result, charging into the battery Ba connected to the charger circuit 41a is decelerated.

Now, in order to facilitate understandings of the embodiment of the present disclosure, a control method is described taking the MPPT control and control by the voltage tracking method as an example.

[MPPT Control]

First, an outline of the MPPT control is described below.

Figure 8A:
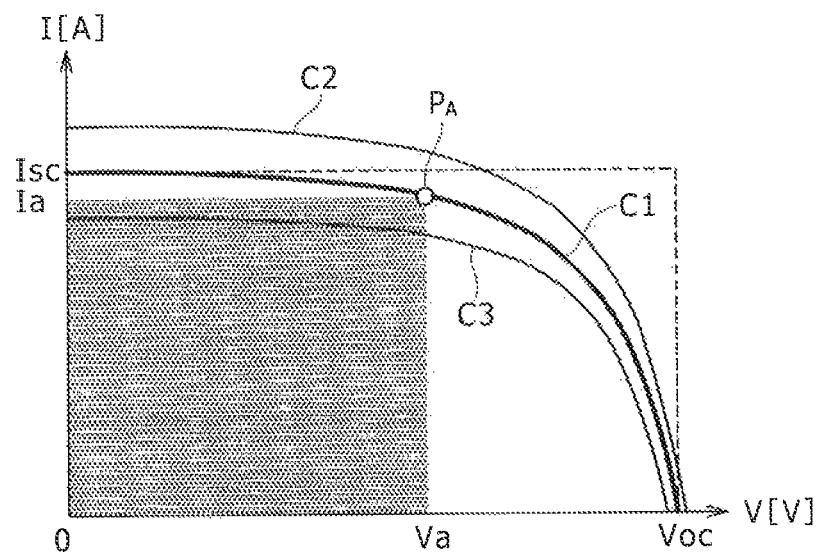
FIG. 8A is a graph illustrating a voltage-current characteristic of a solar cell.

FIG. 8A is a graph illustrating a voltage-current characteristic of a solar cell. In FIG. 8A, the axis or ordinate represents the terminal current of the solar cell, and the axis of abscissa represents the terminal voltage of the solar cell. Further, in FIG. 8A, Isc represents an output current value when the terminals of the solar cell are short-circuited while light is irradiated upon the solar cell, and Voc represents an output voltage when the terminals of the solar cell are open while light is irradiated upon the solar cell. The current Isc and the voltage Voc are called short-circuit current and open-circuit voltage, respectively.

As seen in FIG. 8A, when light is irradiated upon the solar cell, the terminal current of the solar cell indicates a maximum value when the terminals of the solar cell are short-circuited. At this time, the terminal voltage of the solar cell is almost 0. On the other hand, when light is irradiated upon the solar cell, the terminal voltage of the solar cell exhibits a maximum value when the terminals of the solar cell are open. At this time, the terminal current of the solar cell is substantially 0 A.

It is assumed now that the graph indicative of a voltage-current characteristic of the solar cell is represented by a curve C1 shown in FIG. 8A. Here, if a load is connected to the solar cell, then the voltage and current to be extracted from the solar cell depend upon the power consumption required by the load connected to the solar cell. A point on the curve C1 represented by a set of the terminal voltage and the terminal current of the solar cell at this time is called operating point of the solar cell. It is to be noted that FIG. 8A schematically indicates the position of the operating point but does not indicate the position of an actual operating point. This similarly applies also to an operating point appearing on any other figure of the present disclosure.

If the operating point is changed on the curve representative of a voltage-current characteristic of the solar cell, then a set of a terminal voltage Va and terminal current Ia with which the product of the terminal voltage and the terminal current, namely, the generated electric power, exhibits a maximum value, is found. The point represented the set of the terminal voltage Va and the terminal current Ia with which the electric power obtained by the solar cell exhibits a maximum value is called optimum operating point of the solar cell.

When the graph indicative of a voltage-current characteristic of the solar cell is represented by the curve C1 illustrated in FIG. 8A, the maximum electric power obtained from the solar cell is determined by the product of the terminal voltage Va and the terminal current Ia which provide the optimum operating point. In other words, when the graph indicating a voltage-current characteristic of the solar cell is represented by the curve C1 illustrated in FIG. 8A, the maximum electric power obtained from the solar cell is represented by the area of a shadowed region an FIG. 8A, namely by Va×Ia. It is to be noted that the amount obtained, by dividing Va×Ia by Voc×Isc is a fill factor.

The optimum operating point varies depending upon the electric power required by the load connected to the solar cell, and the point $P_A$ representative of the operating point moves on the curve C1 as the electric power required by the load connected to the solar cell varies. When the electric power amount required by the load is small, the current to be supplied to the load may be lower than the terminal current at the optimum operating point. Therefore, the value of the terminal voltage of the solar cell at this time is higher than the voltage value at the optimum operating point. On the other hand, when the electric power amount required by the load is greater than the electric power amount which can be supplied at the optimum operating point, the electric power amount exceeds the electric power which can be supplied at the illumination intensity at this point of time. Therefore, it is considered that the terminal voltage of the solar cell drops toward 0 V.

Curves C2 and C3 shown in FIG. 8A indicate, for example, voltage-current characteristics of the solar cell when the illumination intensity upon the solar cell varies. For example, the curve C2 shown in FIG. 8A corresponds to the voltage-current characteristic in the case where the illumination intensity upon the solar cell increases, and the curve C3 shown in FIG. 8A corresponds to the voltage-current characteristic in the case where the illumination intensity upon the solar cell decreases.

For example, lithe illumination intensity upon the solar cell increases and the curve representative of the voltage-current characteristic of the solar cell changes from the curve C1 to the curve C1, then also the optimum operating point varies in response to the increase of the illumination intensity upon the solar cell. It is to be noted that the optimum operating point at this time moves from a point on the curve C1 to another point on the curve C2.

The MPPT control is nothing but to determine an optimum operating point with respect to a variation of a curve representative of a voltage-current characteristic of the solar cell and control the terminal voltage or terminal current of the solar cell so that electric power obtained from the solar cell may be maximized.

Figure 8B:
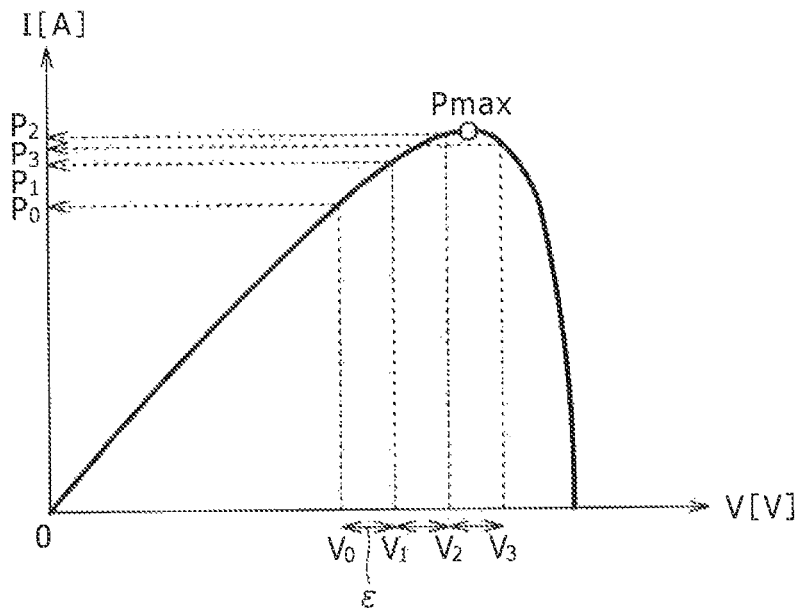
FIG. 8B is a graph, particularly a PV curve, representative of a relationship between the terminal voltage of the solar cell, and the generated electric power of the solar cell in the case where a voltage-current characteristic of the solar cell is represented by a certain curve.

FIG. 8B is a graph, namely, a P-V curve, representative of a relationship between the terminal voltage of the solar cell and the generated electric power of the solar cell in the case where a voltage-current characteristic of the solar cell is represented by a certain curve.

If it is assumed that the generated electric power of the solar cell assumes a maximum value Pmax at the terminal voltage at which the maximum operating point is provided as seen in FIG. 8B, then the terminal voltage which provides the maximum operating point can be determined by a method called mountain climbing method. A series of steps described below is usually executed by a CPU or the like of a power conditioner connected between the solar cell and the power system.

For example, the initial value of the voltage inputted from the solar cell is set to $V_0$, and the generated electric power $P_0$ at this time is calculated first. Then, the voltage to be inputted from the solar cell is incremented by $\epsilon$, which is greater than 0, namely, $\epsilon > 0$ to determine the voltage $V_1$ as represented by $V_1 = V_0 + \epsilon$. Then, the generated electric power $P_1$ when the voltage inputted from the solar cell is $V_1$ is calculated. Then, the generated electric powers $P_0$ and $P_1$ are compared with each other, and if $P_1 > P_0$, then the voltage to be inputted from the solar cell is incremented by $\epsilon$ as represented by $V_2 = V_1 + \epsilon$. Then, the generated electric power $P_2$ when the voltage inputted from the solar cell is $V_2$ is calculated. Then, the resulting generated electric power $P_2$ is compared with the formerly generated electric power $P_1$. Then, if $P_2 > P_1$, then the voltage to be inputted from the solar cell is incremented by $\epsilon$ as represented by $V_3 = V_2 + \epsilon$. Then, the generated electric power $P_3$ when the voltage inputted from the solar cell is $V_3$ is calculated.

Here, if $P_3 < P_2$, then the terminal voltage which provides the maximum operating point exists between the voltages $V_2$ and $V_3$. By adjusting the magnitude of $\epsilon$ in this manner, the terminal voltage which provides the maximum operating point can be determined with an arbitrary degree of accuracy. A bisection method algorithm may be applied to the procedure described above. It is to be noted that, if the P-V curve has two or more peaks in such a case that a shade appears locally on the light irradiation face of the solar cell, then a simple mountain climbing method cannot cope with this. Therefore, the control program requires some scheme.

According to the MPPT control, since, the terminal voltage can be adjusted such that the load as viewed from the solar cell is always in an optimum state, maximum electric power can be extracted from the solar cell in different weather conditions. On the other hand, analog/digital conversion (A/D conversion) is required for calculation of the terminal voltage which provides the maximum operating point and besides multiplication is included in the calculation. Therefore, time is required for the control. Consequently, the MPPT control cannot sometimes respond to a sudden chance of the illumination intensity upon the solar cell in such a case that the sky suddenly becomes cloudy and the illumination intensity upon the solar cell changes suddenly.

[Control by the Voltage Tracking Method]

Here, if the curves C1 to C3 shown in FIG. 8A are compared with each other, then the change of the open voltage Voc with respect to the change of the illumination intensity upon the solar cell, which may be considered a change of a curve representative of a voltage-current characteristic, is smaller than the change of the short-circuit current Isc. Further, all solar cells indicate voltage-current characteristics similar to each other, and it is known that, in the case of a crystal silicon solar cell, the terminal voltage which provides the maximum operating point is found around approximately 80% of the open voltage. Accordingly, it is estimated that, if a suitable voltage value is set as the terminal voltage of the solar cell and the output current of a converter is adjusted so that the terminal voltage of the solar cell becomes equal to the set voltage value, then electric power can be extracted efficiently from the solar cell. Such control by current limitation as just described is called voltage tracking method.

In the following, an outline of the control by the voltage tracking method is described. It is assumed that, as a premise, a switching element is disposed between the solar cell and the power conditioner and a voltage measuring instrument is disposed between the solar cell and the switching element. Also it is assumed that: the solar cell is in a state in which light is irradiated thereon.

First, the switching element is switched off, and then when predetermined time elapses, the terminal voltage of the solar cell is measured by the voltage measuring instrument. The reason Why the lapse of the predetermined time is waited before measurement of the terminal voltage of the solar cell after the switching off of the switching element is that it is intended to wait that the terminal voltage of the solar cell is stabilized. The terminal voltage at this time is the open voltage Voc.

Then, the voltage value of, for example, 80% of the open voltage Voc obtained by the measurement is calculated as a target voltage value, and the target voltage value is temporarily retained into a memory or the like. Then, the switching element is switched on to start energization of the converter in the power conditioner. At this time, the output current of the converter is adjusted so that the terminal voltage of the solar cell becomes equal to the target voltage value. The sequence of processes described above is executed after every arbitrary interval of time.

The control by the voltage tracking method is high in loss of the electric power obtained by the solar cell in comparison with the MPPT control. However, since the control by the voltage tracking method can be implemented by a simple circuit and is lower in cost, the power conditioner including the converter can be configured at a comparatively low cost.

Figure 9A:
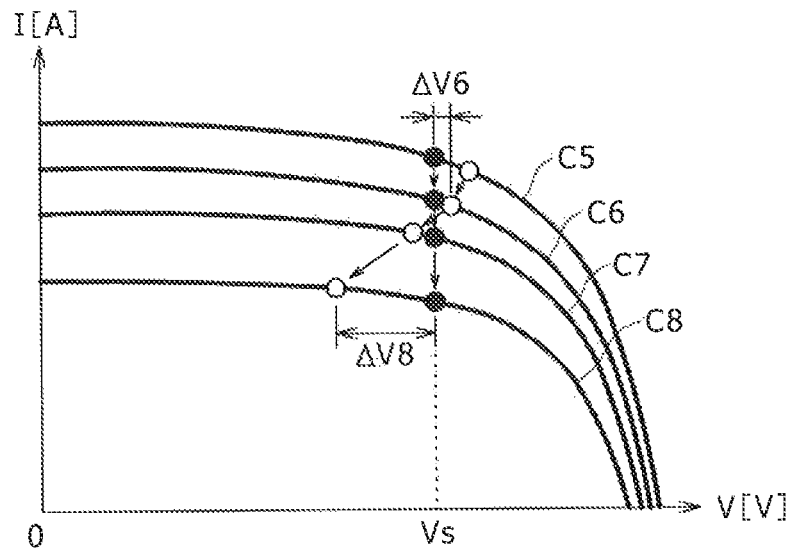
FIG. 9A is a graph illustrating a variation of an operating point with respect, to a change of a curve representative of a voltage-current characteristic of a solar cell.

FIG. 9A illustrates a change of the operating point with respect to a change of a curve representative of a voltage-current characteristic of the solar cell. In FIG. 9A, the axis of ordinate represents the terminal current of the solar cell, and the axis of abscissa represents the terminal voltage of the solar cell. Further, a blank round mark in FIG. 9A represents the operating point when the MPPT control is carried out, and a solid round mark in FIG. 9A represents the operating point when control by the voltage tracking method is carried out.

It is assumed now that the curve representative of a voltage-current characteristic of the solar cell is a curve C5. Then, if it is assumed that, when the illumination intensity upon the solar cell changes, the curve representative of the voltage-current characteristic of the solar cell successively changes from the curve C5 to a curve C8. Also the operating points according to the control methods change in response to the change of the curve representative of the voltage-current characteristic of the solar cell. It is to be noted that, since the change of the open voltage Voc with respect to the change of the illumination intensity upon the solar cell is small, in FIG. 9A, the target voltage value when control by the voltage tracking method is carried out is regarded as a substantially fixed value Vs.

As can be seen from FIG. 9A, when the curve representative of the voltage-current characteristic of the solar cell is a curve C6, the degree of the deviation between the operating point of the MPPT control and the operating point of the control by the voltage tracking method is low. Therefore, it is considered that, when the curve representative of the voltage-current characteristic of the solar cell is the curve C6, there is no significant difference in generated electric power obtained by the solar cell between the two different controls.

On the other hand, if the curve representative of the voltage-current characteristic of the solar cell is the curve C8, then the degree of the deviation between the operating point of the MPPT control and the operating point of the control by the voltage tracking method is high. For example, if the differences ΔV6 and ΔV8 between the terminal voltage when the MPPT control is applied and the terminal voltage when the control by the voltage tracking method is applied, respectively, are compared with each other as seen in FIG. 9A, then ΔV6<ΔV8. Therefore, when the curve representative of the voltage-current characteristic of the solar cell is the curve C8, the difference between the generated electric power obtained from the solar cell when the MPPT control is applied and the generated electric power obtained from the solar cell when the control by the voltage tracking method is applied is great.

[Cooperation Control of the Control Unit and the Battery Unit]

Now, an outline of cooperation control of the control unit and the battery unit is described. In the following description, control by cooperation or Interlocking of the control unit and the battery unit is suitably referred to as cooperation control.

FIG. 95 shows an example of a configuration of a control system wherein cooperation control by a control unit and a plurality of battery units is carried out.

Figure 9B:
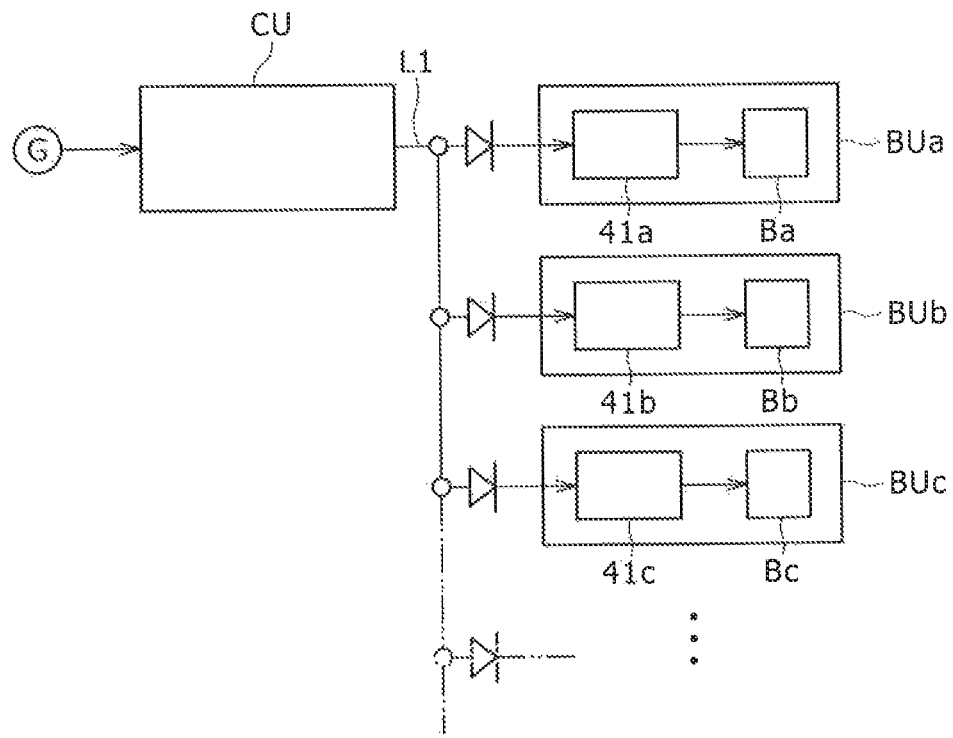

Referring to FIG. SB, for example, one or a plurality of battery units BU each including a set of a charger circuit and a battery are connected to the control unit CU. The one or plural battery units BU are connected in parallel to the electric power line L1 as shown in FIG. 9B. It is to be noted that, while only one control unit CU is shown in FIG. 9B, also in the case where the control system includes a plurality of control units CU, one or a plurality of control units CU are connected in parallel to the electric power line L1.

Generally, if it is tried to use electric power obtained by a solar cell to charge one battery, then the MPPT control or the control by the voltage tracking method described above is executed by a power conditioner interposed between the solar cell and the battery. Although the one battery may be configured from a plurality of batteries which operate in an integrated manner, usually the batteries are those of the single type. In other words, it is assumed that the MPPT control or the control by the voltage tracking method described above is executed by a single power conditioner connected between a solar cell and one battery. Further, the number and configuration, which is a connection scheme such as parallel connection or series connection, of batteries which make a target of charging do not change but are fixed generally during charging.

In the meantime, in the cooperation control, the control unit CU and the plural battery units BUa, BUb, BUc, . . . carry out autonomous control so that the output voltage of the control unit CU and the voltage required by the battery units BU are balanced well with each other. As described hereinabove, the batteries B included in the battery units BUa, BUb, BUc, . . . may be of any types. In other words, the control unit CU according to the present disclosure can carry out cooperation control for a plurality of types of batteries B.

Further, in the configuration example shown in FIG. 9B, the individual battery units BU can be connected or disconnected arbitrarily, and also the number of battery units BU connected to the control unit CU is changeable during electric generation of the solar cell. In the configuration example shown in FIG. 9B, the load as viewed from the solar cell is variable during electric generation of the solar cell. However, the cooperation control can cope not only with a variation of the illumination intensity on the solar cell but also with a variation of the load as viewed from the solar cell during electric generation of the solar cell. This is one of significant characteristics which are not achieved by configurations in related arts.

It is possible to construct a control system which dynamically changes the charge rate in response to the supplying capacity from the control unit CU by connecting the control unit CU and the battery units BU described above to each other. In the following, an example of the cooperation control is described. It is to be noted that, although, in the following description, a control system wherein, in an initial state, one battery unit BUa is connected to the control unit CU is taken as en example, the cooperation control applies similarly also where a plurality of battery units BU are connected to the control unit CU.

It is assumed that, for example, the solar cell is connected to the input side of the control unit CU and the battery unit BUa is connected to the out side of the control unit CU. Also it is assumed that the upper limit to the output voltage of the solar cell is 100 V and the lower limit to the output voltage of the solar cell is desired to be suppressed to 75 V. In other words, it is assumed that the voltage $Vt_0$ is set to $Vt_0=75$ V and the input voltage to the negated input terminal of the operational, amplifier 35 is kc×75 V.

Further, it is assumed that the upper limit and the lower limit to the output voltage from the control unit CU are set, for example, to 48 V and 45 V, respectively, in other words, it is assumed that the voltage Vb is set to Vb=45 V and the input voltage to the negated input terminal of the operational amplifier 55 is kb×45 V. It is to be noted that the value of 48 V which is the upper limit to the output terminal from the control unit CU is adjusted by suitably selecting the resistors Rc1 and Rc2 in the high voltage input power supply circuit 11. In other words, it is assumed that the target voltage value of the output from the control unit CU is set to 48 V.

Further, it is assumed that the upper limit and the lower limit to the output voltage from the charger circuit 41a of the battery unit BUa are set, for example, to 42 V and 26 V, respectively. Accordingly, the resistors Rb1, Rb2 and Rb3 in the charger circuit 41a are selected so that the upper limit and the lower limit to the output voltage from the charger circuit 41a may become 42 V and 28 V, respectively.

It is to be noted that a state in which the input voltage to the charger circuit 41a is the upper limit voltage corresponds to a state in which the charge rate into the battery Ba is 100% whereas another state in which the input voltage to the charger circuit 41a is the lower limit voltage corresponds to a state in which the charge rate is 0%. In particular, the state in which the input voltage to the charger circuit 41a is 48 V corresponds to the state in which the charge rate into the battery Ba is 100%, and the state in which the input voltage to the charger circuit 41a is 45 V corresponds to the state in which the charge rate into the battery Ba is 0%. In response to the variation within the range of the input voltage, from 45 to 48 V, the charge rate is set within the range of 0 to 100%.

It is to be noted that charge rate control into the battery may be carried out in parallel to and separately from the cooperation control. In particular, since constant current charging is carried out at an initial stage of charging, the output from the charger circuit 41a is feedback-adjusted to adjust the charge voltage so that the charge current may be kept lower than fixed current. Then at a final stage, the charge voltage is kept equal to or lower than a fixed voltage. The charge voltage adjusted here is equal to or lower than the voltage adjusted by the cooperation control described above. By the control, a charging process is carried out within the electric power supplied from the control unit CU.

First, a change of the operating point when the cooperation control is carried out in the case where the illumination intensity upon the solar cell changes is described.

Figure 10A:
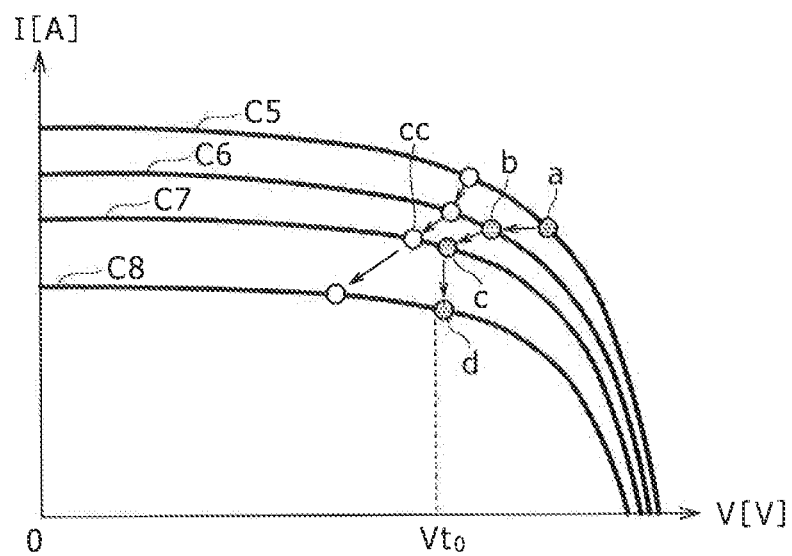
FIG. 10A is a graph illustrating a variation of an operating point when cooperation control is carried out in the case where the illumination intensity upon a solar cell decreases.

FIG. 10A illustrates a change of the operating point when the cooperation control is carried out in the case where the illumination intensity upon the solar cell decreases. In FIG. 10A, the axis of ordinate represents the terminal current of the solar cell and the axis of abscissa represents the terminal, voltage of the solar cell. Further, a blank round mark in FIG. 10A represents an operating point when the MPPT control is carried out, and a shadowed round mark in FIG. 10A represents an operating point when the cooperation control is carried out. Curves C5 to C8 shown in FIG. 10A represent voltage-current characteristics of the solar cell when the illumination intensity upon the solar cell changes.

It is assumed now that the electric power required by the battery Ba is 100 W (watt) and the voltage current characteristic of the solar cell is represented by the curve C5 which corresponds to the most sunny weather state. Further, it is assumed that the operating point of the solar cell at this time is represented, for example, by a point a on the curve C5, and the electric power or supply amount supplied from the solar cell to the battery Ba through the high voltage input power supply circuit 11 and the charger circuit 41a is higher than the electric power or demanded amount required by the battery Ba.

When the electric power supplied from the solar cell to the battery Ba is higher than the electric power required by the battery Ba, the output voltage from the control unit CU to the battery unit BUa, namely the voltage V12, is 48 V of the upper limit. In particular, since the input voltage to the battery unit BUa is 48 V of the upper the limit, the output voltage from the charger circuit 41a of the battery unit BUa is 42 V of the upper limit, and charge into the battery Ba is carried out at the charge rate of 100%. It is to be noted that surplus electric power is abandoned, for example, as heat. It is to be noted that, although it has been described that the charge into the battery is carried out at 100%, the charge into the battery is not limited to 100% but can be adjusted suitably in accordance with a characteristic of the battery.

If the sky begins to become cloudy from this state, then the curve representative of the voltage-current characteristic of the solar cell changes from the curve C5 to the curve C6. As the sky becomes cloudy, the terminal voltage of the solar cell gradually drops, and also the output voltage from the control unit CU to the battery unit BUa gradually drops. Accordingly, as the curve representative of the voltage-current characteristic of the solar cell changes from the curve C5 to the curve C6, the operating point of the solar cell moves, for example, to a point b on the curve C6.

If the sky becomes cloudier from this state, then the curve representative of the voltage-current characteristic of the solar cell changes from the curve C6 to the curve C7, and as the terminal voltage of the solar cell gradually drops, also the output voltage from the control unit CU to the battery unit BUa drops. When the output voltage from the control unit CU to the battery unit BUa drops by some degree, the control system cannot supply the electric power of 100% to the battery Ba any more.

Here, if the terminal voltage of the solar cell approaches $Vt_0=75$ V of the lower limit from 100 V, then the high voltage input power supply circuit 11 of the control unit CU begins to step down the output voltage to the battery unit BUa from 48 V toward Vb 45 V.

After the output voltage from the control unit CU to the battery unit BUa begins to drop, the input voltage to the battery unit BUa drops, and consequently, the charger circuit 41a of the battery unit BUa begins to step down the output voltage to the battery Ba. When the output voltage from the charger circuit 41a drops, the charge current supplied to the battery Ba decreases, and the charging into the battery Ba connected to the charger circuit 41a is decelerated. In other words, the charge rate into the battery Ba drops.

As the charge rate to the battery Ba drops, the power consumption, decreases, and consequently, the load as viewed from the solar cell decreases. Consequently, the terminal, voltage of the solar cell rises or recovers by the decreased amount of the load as viewed from the solar cell.

As the terminal voltage of the solar cell rises, the degree of the drop of the output voltage from the control unit CU to the battery unit BUa decreases and the Input voltage to the battery unit BUa rises. As the input voltage to the battery unit BUa rises, the charger circuit 41a of the battery unit BUa steps up the output voltage from the charger circuit 41a to raise the charge rate into the battery Ba.

As the charge rate into the battery Ba rises, the load as viewed from the solar cell increases and the terminal voltage of the solar cell drops by the increased amount of the load as viewed from the solar cell. As the terminal voltage of the solar cell drops, the high voltage input power supply circuit 11 of the control unit CU steps down the output voltage to the battery unit BUa.

Thereafter, the adjustment of the charge rate described above is repeated automatically until the output voltage from the control unit CU to the battery unit BUa converges to a certain value to establish a balance between the demand and the supply of the electric power.

The cooperation control is different from the MPPT control in that it is not controlled by software. Therefore, the cooperation control does not require calculation of the terminal voltage which provides a maximum operating point. Further, the adjustment of the charge rate by the cooperation control does not include calculation by a CPU. Therefore, the cooperation control is low in power consumption in comparison with the MPPT control, and also the charge rate adjustment described above is executed in such a short period of time of approximately several nanoseconds to several hundred nanoseconds.

Further, since the high voltage input power supply circuit 11 and the charger circuit 41a merely detect the magnitude of the input voltage thereto and adjust the output voltage, analog/digital conversion is not required and also communication between the control unit CU and the battery unit BUa is not required. Accordingly, the cooperation control does not require complicated circuitry, and the circuit for implementing the cooperation control is small in scale.

Here, it is assumed that, at the point a on the curve C5, the control unit CU can supply the electric power of 100 W and the output voltage from the control unit CU to the battery unit BUa converges to a certain value. Further, it is assumed that the operating point of the solar cell changes, for example, to the point c on the curve C7. At this time, the electric power supplied to the battery Ba becomes lower than 100 W. However, as seen in FIG. 10A, depending upon selection of the value of the voltage $Vt_0$, electric power which is not inferior to that in the case wherein the MPPT control is carried out can be supplied to the battery Ba.

If the sky becomes further cloudy, then the curve representative of the voltage-current characteristic of the solar cell changes from the curve C7 to the curve C8, and the operating point of the solar cell changes, for example, to a point d on the curve C8.

As seen in FIG. 10A, since, under the cooperation control, the balance between the demand and the supply of electric power is adjusted, the terminal voltage of the solar cell does not become lower than the voltage $Vt_0$. In other words, under the cooperation control, even if the illumination intensity on the solar cell drops extremely, the terminal voltage of the solar cell does not become lower than the voltage $Vt_0$ at all.

If the illumination intensity on the solar cell drops extremely, then the terminal voltage of the solar cell comes to exhibit a value proximate to the voltage $Vt_0$, and the amount of current supplied to the battery Ba becomes very small. Accordingly, when the illumination intensity on the solar cell drops extremely, although time is required for charging of the battery Ba, since the demand and the supply of electric power in the control system are balanced well with each other, the control system does not suffer from the system down.

Since the adjustment of the charge rate by the cooperation control is executed in very short time as described above, according to the cooperation control, even if the sky suddenly begins to become cloudy and the illumination intensity on the solar cell decreases suddenly, the system down of the control system can be avoided.

Now, a change of the operating point when the cooperation control is carried out in the case where the load as viewed, from the solar cell, changes is described.

Figure 10B:
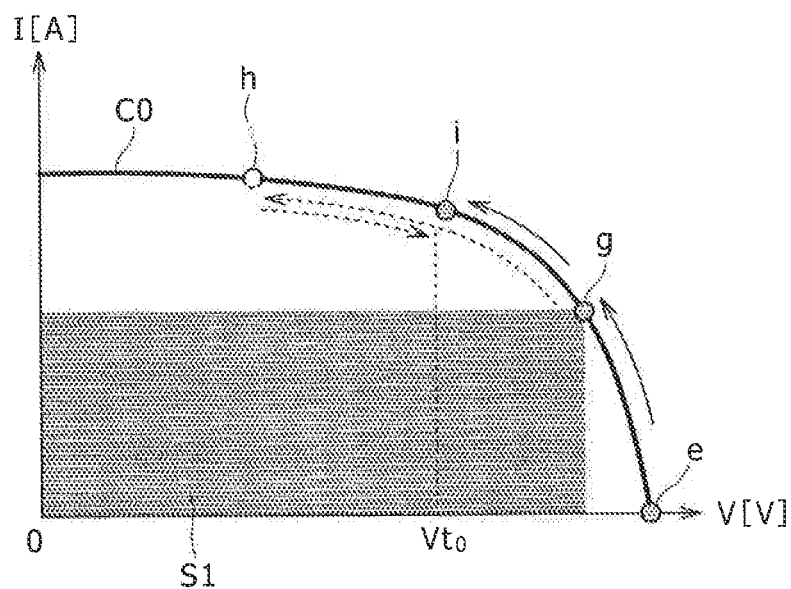
FIG. 10B is a graph illustrating a variation of an operating point when cooperation control is carried out in the case where the load as viewed from the solar cell increases.

FIG. 10B illustrates a change of the operating point when the cooperation control is carried out in the case where the load as viewed from the solar cell increases. In FIG. 10B, the axis of ordinate represents the terminal current of the solar cell and the axis of abscissa represents the terminal voltage of the solar cell. Further, a shadowed round mark in FIG. 10B represents an operating point when the cooperation control is carried out.

It is assumed now that the illumination intensity on the solar cell does not change and the voltage-current characteristic of the solar cell is represented by a curve C0 shown in FIG. 10B.

Immediately after the control system is started up, it estimates that the power consumption in the inside thereof is almost zero, and therefore, the terminal voltage of the solar cell may be considered substantially equal to the open voltage. Accordingly, the operating point of the solar cell immediately after the startup of the control system may be considered existing, for example, at a point e on the curve C0. It is to be noted that the output voltage from the control unit CU to the battery unit BUa may be considered to be 48 V of the upper limit.

After supply of electric power to the battery Ba connected to the battery unit BUa is started, the operating point of the solar cell moves, for example, to a point g on the curve C0. It is to be noted that since, in the description of the present example, the electric power required by the battery Ba is 100 W, the area of a region S1 indicated by a shadow in FIG. 10B is equal to 100 W.

When the operating point of the solar cell is at the point g on the curve C0, the control system is in a state in which the electric power supplied from the solar cell to the battery Ba through the high voltage input power supply circuit 11 and the charger circuit 41a is higher than the electric power required by the battery Ba. Accordingly, the terminal voltage of the solar cell, the output voltage from the control unit CU and the voltage supplied to the battery Ba when the operating point of the solar cell is at the point g on the curve C0 are 100 V, 48 V and 42 V, respectively.

Here, it is assumed that the battery unit BUb having a configuration similar to that of the battery unit BUa is newly connected to the control unit CU. If it is assumed that the battery Bb connected to the battery unit BUb requires electric power of 100 W for the charge thereof similarly to the battery Ba connected to the battery unit BUa, then the power consumption increases and the load as viewed from the solar cell increases suddenly.

In order to supply totaling electric power of 200 W to the two batteries, the totaling output current must be doubled, for example, while the output voltage from the charger circuit. 41a of the battery unit BUa and the charger circuit 41b of the battery unit BUb is maintained.

However, where the power generator is the solar cell, also the terminal voltage of the solar cell drops together with increase of output current from the charger circuits 41a and 41b. Therefore, the totaling output current must be higher than twice in comparison with that in the case when the operating point of the solar cell is at the point g. Therefore, the operating point of the solar cell must be, for example, at a point h on the curve C0 as shown in FIG. 10B, and the terminal voltage of the solar cell drops extremely. If the terminal voltage of the solar cell drops extremely, then the control system may suffer from system down.

In the cooperation control, if the terminal voltage of the solar cell, drops as a result of new or additional connection of the battery unit BUb, then adjustment of the balance between the demand and the supply of electric power in the control system is carried out. In particular, the charge rate into the two batteries is lowered automatically so that electric power supplied to the battery Ba and the battery Bb may totally become, for example, 15.0 W.

In particular, if the terminal voltage of the solar cell drops as a result of new connection of the battery unit BUb, then also the output voltage from the control unit CU to the battery units BUa and BUb drops. If the terminal voltage of the solar cell approaches $Vt_0=75$ V of the lower limit from 100 V, then the high voltage input power supply circuit 11 of the control unit CU begins to step down the output voltage to the battery units BUa and BUb toward Vb=45 V from 48 V.

As the output voltage from the control unit CU to the battery units BUa and BUb is stepped down, the input voltage to the battery units BUa and BUb drops. Consequently, the charger circuit 41a of the battery unit BUa and the charger circuit 41b of the battery unit BUb begin to step down the output voltage to the batteries Ba and Bb, respectively. As the output voltage from the charger circuit drops, the charging into the batteries connected to the charger circuit is decelerated. In other words, the charge rate to each battery is lowered.

As the charge rate into each battery is lowered, the power consumption decrease as a whole, and consequently, the load as viewed from the solar cell decreases and the terminal voltage of the solar cell rises or recovers by an amount corresponding to the decreasing amount of the load as viewed from the solar cell.

Thereafter, adjustment of the charge rate is carried out until the output voltage from the control unit CU to the battery units BUa and BUb converges to a certain value to establish a balance between the demand and the supply of electric power in a similar manner as in the case where the illumination intensity on the solar cell decreases suddenly.

It is to be noted that it depends upon the situation to which value the voltage value actually converges. Therefore, although the value to which the voltage value actually converges is not, known clearly, since charging stops when the terminal voltage of the solar cell becomes equal to $Vt_0=75$ V of the lower limit, it is estimated that the voltage value converges to a value a little higher than the value of $Vt_0$ of the lower limit. Further, it is estimated that, since the individual battery units are not controlled in an interlocking relationship with each other, even if the individual battery units have the same configuration, the charge rate differs among the individual battery units due to a dispersion of used elements. However, there is no change in that the battery units can generally be controlled by the cooperation control.

Since the adjustment of the charge rune by the cooperation control is executed in a very short period of time, if the battery unit BUb is connected newly, then the operating point of the solar cell changes from the point g to a point i on the curve C0. It is to be noted that, while a point h is illustrated as an example of the operating point of the solar cell on the curve C0 for the convenience of description in FIG. 10B, under the cooperation control, the operating point of the solar cell does not actually chance to the point h.

In this manner, in the cooperation control, the charger circuit of the individual battery units BU detects the magnitude of the input voltage thereto in response to an increase of the load as viewed from the solar cell, and automatically suppresses the current amount to be sucked thereby. According to the cooperation control, even if the number of those battery units BU which are connected to the control unit CU increases to suddenly increase the load as viewed from the solar cell, otherwise possible system down of the control system can be prevented.

Now, a change of the operating point when the cooperation control is carried out in the case where both of the illumination intensity on the solar cell and the load as viewed from the solar cell vary is described.

Figure 11:
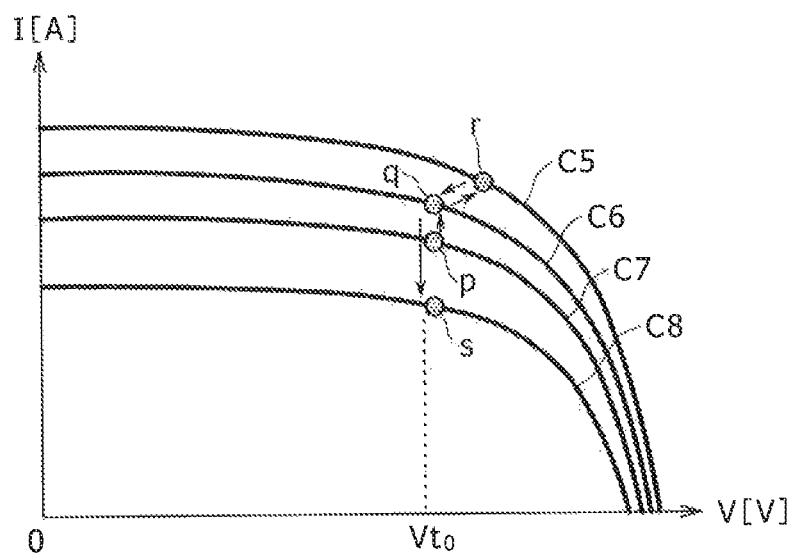
FIG. 11 is a graph illustrating a variation of an operating point when cooperation control is carried out in the case where both of the illumination intensity upon the solar cell and the load as viewed from the solar cell vary.

FIG. 11 illustrates a change of the operating point when the cooperation control is carried out in the case where both of the illumination intensity on the solar cell and the load as viewed from the solar cell vary. In FIG. 11, the axis of ordinate represents the terminal current of the solar cell and the axis of abscissa represents the terminal voltage of the solar cell. A shadowed round mark in FIG. 11 represents an operating point when the cooperation control is carried out. Curves C5 to C8 shown in FIG. 11 indicate voltage-current characteristics of the solar cell in the case where the illumination intensity upon the solar cell varies.

First, it is assumed that the battery unit BUa which includes the battery Ba which requires the electric power of 100 W for the charging thereof is connected to the control unit CU. Also it is assumed that the voltage-current characteristic of the solar cell at this time is represented by a curve C7 and the operating point of the solar cell is represented by a point p on the curve C7.

It is assumed that the terminal voltage of the solar cell at the point p considerably approaches the voltage $Vt_0$ set in advance as a lower limit to the output voltage of the solar cell. That the terminal voltage of the solar cell considerably approaches the voltage $Vt_0$ signifies that, in the control system, adjustment of the charge rate by the cooperation control is executed and the charge rate is suppressed significantly. In particular, in the state in which the operating point of the solar cell is represented by the point p shown in FIG. 11, the electric power supplied to the battery Ba through the charger circuit 41a is considerably higher than the electric power supplied to the high voltage input power supply circuit 11 from the solar cell. Accordingly, in the state in which the operating point of the solar cell is represented by the point p shown in FIG. 11, adjustment of the charge rate is carried out by a great amount, and electric power considerably lower than 100 W is supplied to the charger circuit 41a which charges the battery Ba.

It is assumed that the illumination intensity upon the solar cell thereafter increases and the curve representative of the voltage-current characteristic of the solar cell changes from the curve C7 to the curve C6. Further, it is assumed that the battery unit BUb which has a configuration similar to that of the battery unit BUa is newly connected to the control unit CU. At this time, the operating point of the solar cell changes, for example, from the point p on the curve C7 to a point q on the curve C6.

Since the two battery units are connected to the control unit CU, the power consumption when the charger circuits 41a and 41b fully charge the batteries Ba and Bb is 200 W. However, when the illumination intensity upon the solar cell is not sufficient, the cooperation control is continued and the power consumption is adjusted to a value lower than 200 W such as, for example, to 150 W.

It is assumed here that the sky thereafter clears up and the curve representative of the voltage-current characteristic of the solar cell changes from the curve C6 to the curve C5. At this time, when the generated electric power of the solar cell increases together with the increase of the illumination intensity upon the solar cell, the output current from the solar cell increases.

If the illumination intensity upon the solar cell increases sufficiently and the generated electric power of the solar cell, further increases, then the terminal voltage of the solar cell becomes sufficiently higher than the voltage $Vt_0$ at a certain point. If the electric power supplied from the solar cell to the two batteries through the high voltage input power supply circuit 11 and the charger circuits 41a and 41b comes to be higher than the electric power required to charge the two batteries, then the adjustment of the charge rate by the cooperation control, is moderated or automatically cancelled.

At this time, the operating point of the solar cell is represented, for example, by a point r on the curve C5 and charging into the individual batteries Ba and Bb is carried out at the charge rate of 100%.

Then, it is assumed that the illumination intensity upon the solar cell decreases and the curve representative of the voltage-current characteristic of the solar cell changes from the curve C5 to the curve C6.

When the terminal voltage of the solar cell drops and approaches the voltage $Vt_0$ set in advance, the adjustment of the charge rate by the cooperation control is executed again. The operating point of the solar cell at this point of time is represented by a point q of the curve C6.

It is assumed that the illumination intensity on the solar cell thereafter decreases further and the curve representative of the voltage-current characteristic of the solar cell changes from the curve C6 to the curve C8.

Consequently, since the charge rate is adjusted so that the operating point of the solar cell may not become lower than the voltage $Vt_0$, the terminal current from the solar cell decreases, and the operating point of the solar cell changes from the point q on the curve C6 to a point s on the curve C8.

In the cooperation control, the balance between the demand and the supply of electric power between the control unit CU and the individual battery units BU is adjusted so that the input voltage to the individual battery units BU may not become lower than the voltage $Vt_0$ determined in advance. Accordingly, with the cooperation control, the charge rate into the individual batteries B can be changed on the real time basis in response to the supplying capacity of the input side as viewed from the individual battery units BU. In this manner, the cooperation control can cope not only with a variation of the illumination intensity on the solar cell but also with a variation of the load as viewed from the solar cell.

As described hereinabove, the present disclosure does not require a commercial power supply. Accordingly, the present disclosure is effective also in a district in which a power supply apparatus or electrical power network is not maintained.

[Unit Number Controlling Process]

Figure 12:
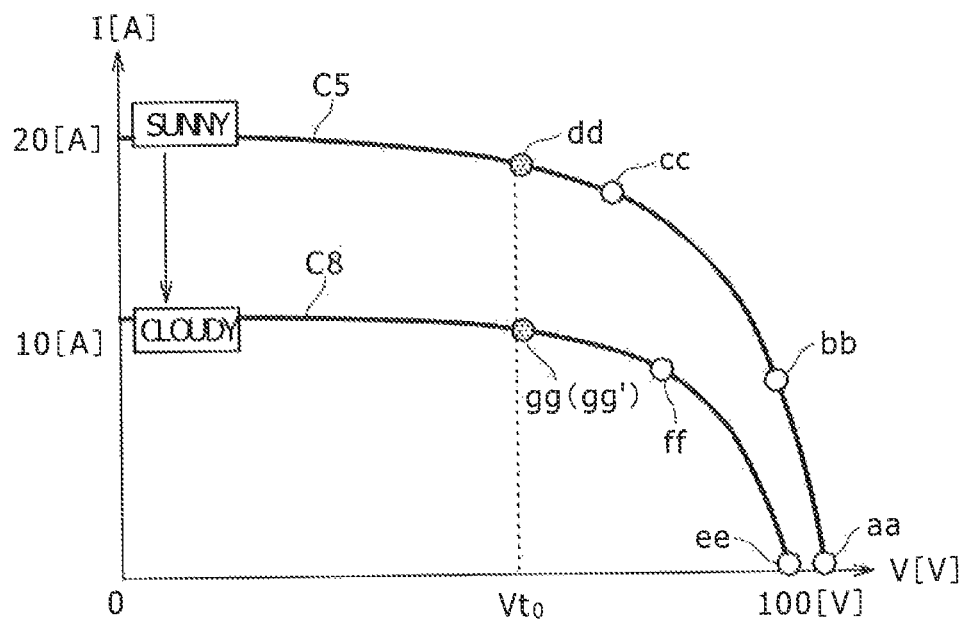
FIG. 12 is a graph illustrating an example of a change of an operating point when both of the illumination intensity upon the solar cell and the load as viewed from the solar cell vary.

Now, a unit number controlling process is described. The unit number controlling process is a process of changing the number of battery units for which a charging process is to be carried out. FIG. 12 illustrates a voltage-current characteristic when the illumination intensity on the solar cell varies. FIG. 12 illustrates a change of the operating point when the number of battery units to be charged is also changed.

It is assumed that, in a sunny weather state, the voltage-current characteristic of the solar cell is represented, for example, by a curve C5. When the number of battery units for which a charging process is to be carried out is 0, the operating point is a point aa. As the number of battery units for which a charging process is to be carried out increases, the current flowing through the battery units increases. For example, if a charging process for a first battery unit is started, then the operating point moves from the point as to another point bb. Then, if a charging process for a second battery unit is started, then the operating point moves from the point bb to a further point cc. Then, if a charging process for a third battery unit is started, then the operating point moves from the point cc to a still, further point dd.

On the other hand, it is assumed that, in a cloudy weather state, the voltage-current characteristic of the solar cell is represented, for example, by a curve C8. When the number of battery units for which a charging process is to be carried out is 0, the operating point is a point ee. As the number of battery units for which a charging process is to be carried out increases, the current flowing through the battery units increases. For example, if a charging process for a first battery unit is started, then the operating point moves from the point ee to another point ff. Then, if a charging process for a second battery unit is started, then the operating point moves from the point if to a further point gg. Here, if the voltage V becomes equal to or comes near to the voltage $Vt_0$, then the cooperation control described hereinabove is rendered operative. Therefore, even if the number of units for which a charging process is to be carried out is increased to three units, the operating point little moves on the curve C8. The operating point at this point of time is represented by a point gg'. The positions of the operating points gg and gg' are almost same as each other. However, at the operating point gg, a charging process is carried out for two battery units. At the operating point gg', a charging process is carried out such that electric power when charging is carried out for two units is distributed to three battery units.

Here, the output by the photovoltaic power generation varies depending upon the weather. Naturally, not only in the photovoltaic power generation but also in wind power generation or manpower generation, the output varies depending upon the situation. When the output of the electric power generation section varies in this manner, it can become a subject in what manner the number of battery units for which a charging process is to be carried out is changed. For example, when the operating point moves from the pint dd to the point gg', it is necessary to determine whether or not the number of units is to be decreased to move the operating point to the point gg.

As one method, it seems a possible idea to change the number of units in response to a change in weather. For example, in a sunny weather state, the number of buttery units for which a charging process is to be carried out is successively increased from one to two or three. Then, if the weather becomes cloudy, the charging process for the third unit is stopped to decrease the number of battery units for which a charging process is to be carried out to two. However, the change in weather lacks in regularity. Particularly in such a weather that a sunny weather and a cloudy weather repeat alternately, the process of starting and stopping the charging process for the third battery unit is repeated. Such a state as just described imposes a burden on the battery or the charger circuit of the third battery unit, and this is unfavorable. Therefore, in the embodiment of the present disclosure, the following unit number controlling process is carried out.

[First Unit Number Controlling Process]

Figure 13:
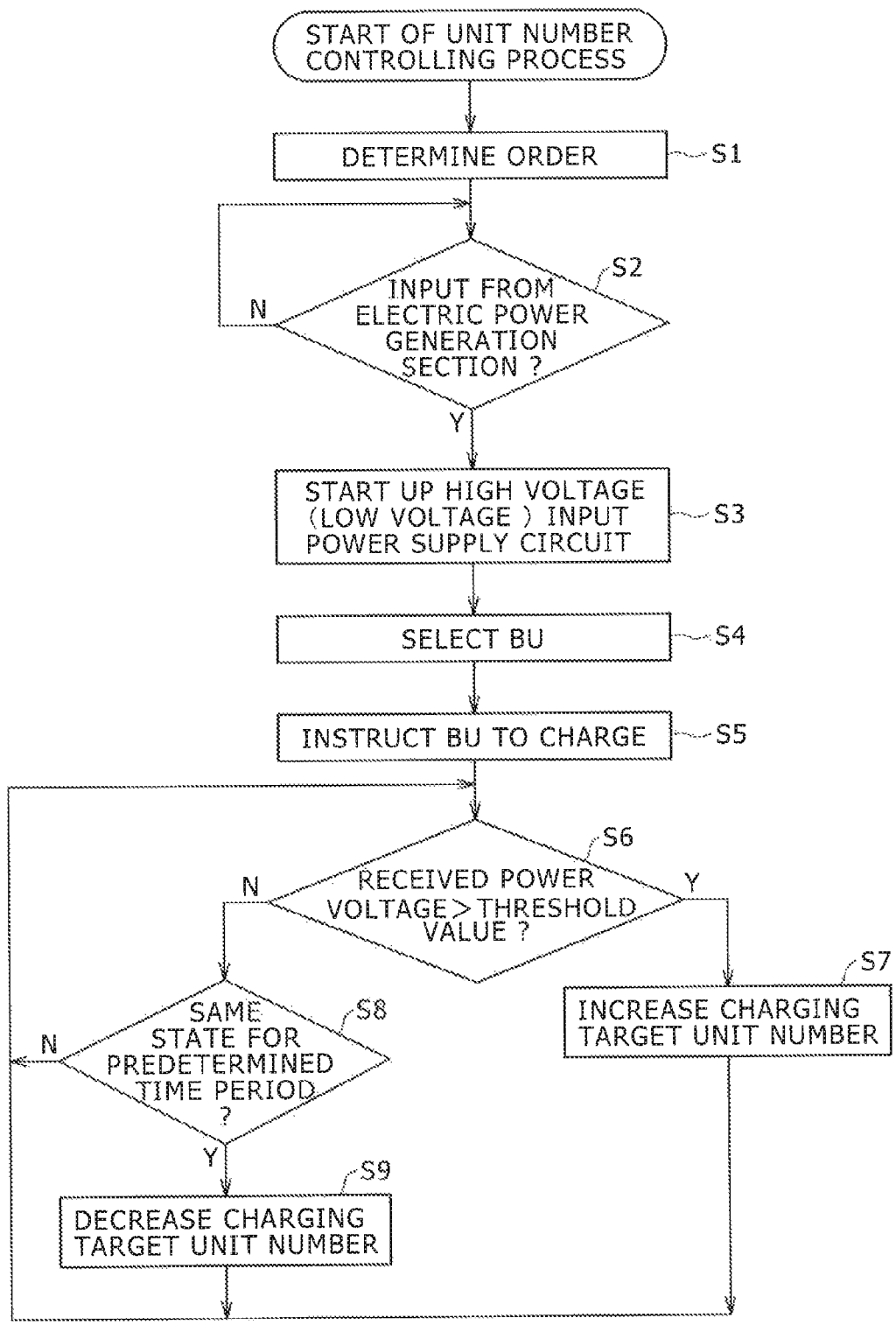
FIG. 13 is a flow chart illustrating an example of a flow of processing of a first unit number controlling process.

FIG. 13 is a flow chart illustrating an example of a flow of processing of a first unit number controlling process. Unless otherwise specified, the processes described below are carried out by the CPU 13 of the control unit CU. Referring to FIG. 13, after the first unit number controlling process is started, first at step S1, an order in or ranks by which the battery units are to be charged are determined such that a battery unit for which a charging process is to be carried out may have priority. Particularly, the ranking is carried out such that, for example, a battery unit which has a comparatively low remaining capacity or has comparatively high chargeability may have priority. It is assumed here that the highest priority or rank is provided to the battery unit BUa; the second highest priority or rank is provided to the battery unit BUb; and the third highest priority or rank is provided to the battery unit BUc. Then, the processing advances to step S2.

At step S2, it is decided whether or not an input from an electric power generation section is received. The electric power generation section generates electric power by photovoltaic power generation, wind power generation or human power generation as described hereinabove. If an input from the electric power generation section is not received, then the process at step S2 is repeated. If an input from the electric power generation section is received, then the processing advances to step S3. The input from the electric power generation section is supplied to the high voltage input power supply circuit 11 or the low voltage input power supply circuit 12 of the control unit CU. A voltage supplied from the electric power generation section to the control unit CU is suitably referred to as received power voltage. The received power voltage fluctuates by a variation of a state such as, for example, a change in weather.

At step S3, the high voltage input power supply circuit 11 is started up. Depending con the electric power generation section which supplies the voltage, the low voltage input power supply circuit 12 is stared up. Then, the processing advances to step S4.

At step S4, a battery unit BU is selected. For example, from among the battery units ranked by the process at step S1, a battery of the first rank is selected. Here, the battery unit BUa is selected. Then, the processing advances to step S5. Au step S5, a charging instruction is issued to the battery unit BUa. The charging instruction is provided from the control unit CU to the battery unit BUa. The battery unit BUa starts a charging process in response to the charging instruction. It is to be noted that details of the process of starting charging into a battery unit BU and the process of stopping the charging in response to an instruction from the control unit CU have been described hereinabove, and therefore, overlapping description of them is omitted herein to avoid redundancy. Then, the processing advances to step S6.

At step S6, it is decided whether or not the received power voltage is higher than a threshold value. It is to be noted that the condition of the comparison may be set so as to permit the case where the received power voltage is equal to the threshold value. The threshold value is set, for example, to a value obtained by adding an offset of approximately several volts to the value of the voltage $Vt_0$, which is 75 V. For example, the threshold value is set to approximately 78 V. If the received power voltage is higher than the threshold value, then the processing advances to step S7.

That the received power voltage is higher than the threshold value signifies that the supply amount from the electric power generation section is greater than the demand amount. Therefore, at step S7, the number of those battery units which are to be charged is increased. It is to be noted that the number of the battery units to be charged is hereinafter referred to suitably as charging target unit number. Here, since the charging process is being carried out already for the battery unit BUa of the first rank, a charging instruction is issued to the battery unit BUb of the second rank at step S7. A charging process for the battery unit BUb is started in response to the charging instruction. Then, the processing returns to step S6. Thus, when the received power voltage is higher than the threshold value, a charging instruction is successively issued to a battery unit BU in accordance with the rank determined at step S1.

If the received power voltage is equal to or lower than the threshold value at step S6, then the processing advances to step S8. At step S8, it is decided whether or not a state in which the received power voltage is equal to or lower than the threshold value continues for a predetermined period of time. The predetermined period of time is set, for example, to approximately several minutes to 10 minutes. If the state in which the received power voltage is equal to or lower than the threshold value does not continue for the predetermined period of time, then the processing returns to step S6.

If the state in which the received power voltage is equal to or lower than the threshold value continues for the predetermined period of time, then the processing advances to step S9. That the received power voltage is equal to or lower than the threshold value signifies that the demand amount by the battery unit is equal to or greater than the supply amount from the electric power generation section. Therefore, at step S9, the charging process by the battery unit whose charging process was started last is stopped. Then, the processing returns to step S6.

In this manner, in the first unit number controlling process, even when the received power voltage is equal to or lower than the threshold value, the charging target unit number is not decreased immediately. The charging target unit number is decreased after it is decided that the predetermined period of time elapses. Consequently, for example, even if the weather changes from a sunny weather to a cloudy weather and then changes back to a sunny weather before long, the unit number is not changed. In particular, such a situation that starting and stopping of a charging process of a certain battery unit are repeated frequently can be prevented.

Before the process at step S7 is carried out, a process similar to that carried out at step S8 may be carried out. However, when the supply amount from the electric power generation section is greater than the demand amount by the battery unit, in order to efficiently use the supply amount from the electric power generation section, preferably the charging target unit number is increased without waiting lapse of the predetermined period of time. If lapse of the predetermined period of time is decided in only one of the process of increasing the charging target unit number and the process of decreasing the charging target unit number, then such a situation that starting and stopping of a charging process into the battery unit BU are repeated frequently can be prevented.

It is to be noted that, in the comparison with the threshold value at step S6, a threshold value may be used which is different depending upon whether the charging target unit number is to be increased or decreased. When the unit number is to be increased, the threshold value is set, for example, to approximately 78 V. When the unit number is to be decreased, the threshold value is preferably set to a value of the volts e $Vt_0$, for example, 75 V or to approximately 75.5 V which is a little higher than the voltage $Vt_0$.

[Second Unit Number Controlling Process]

Now, a second unit number controlling process is described. In order to facilitate understandings of the second unit number controlling process, description is given using a particular example. It is to be noted that, in the particular example, it is assumed that charge power for the battery units is 100 W. For example, the supply amount from the solar cell is 210 W.

FIG. 14 illustrates a first particular example. Referring to FIG. 14, when a charging process for two battery units BU is being carried out, the supply amount, which is 210 W, exceeds the demand amount, which is 200 W for the two battery units BU. Accordingly, the cooperation control does not operate but is off. At this time, 10 W from within the supply amount is not used but becomes a loss. It is assumed that electric power of 12 W is consumed by the charger circuit 41 in each of the battery units BU. In this instance, the electric power actually charged into the two battery units is 200 W-24 W, which is electric power consumed by the two charger circuits, and hence is 176 W. The electric power actually used for the charge is hereinafter referred to as effective charge power.

Since the supply amount of the photovoltaic power generation exceeds the demand amount by the battery unit side, in a usual case, the charging target unit number is increased. However, the second unit number controlling process carries out control so that electric power from the electric power generation section can be used more efficiently taking the power consumption by the charger circuit into consideration.

For example, it is assumed that the charging target unit number is increased to three. In this instance, since the demand amount by the battery unit side, which is 300 W, exceeds the supply amount from the photovoltaic power generation, which is 210 W, the cooperation control is turned on. The supply amount of the photovoltaic power generation is all used as the charge power. Therefore, no loss occurs. In this instance, the effective charge power is 210 W-36 W, which is electric power consumed by the three charger circuits, and hence is 171 W.

If the effective charge powers in both cases are compared with each other, then the effective charge power of 176 W represents efficient use of the supply amount of the photovoltaic power generation. In such a case, the charging target unit number is not increased but remains two. If the charging target unit number at present is three, then the charging target unit number is decreased to two.

FIG. 15 illustrates a second particular example. Referring to FIG. 15, when a charging process for two battery units BU is being carried out, the supply amount, which is 210 W, exceeds the demand amount, which is 200 W, because the two battery units BU are involved. Accordingly, the cooperation control does not operate but is off. At this time, 10 W from within the supply amount is not used but becomes a loss.

The power consumption of the charger circuit 41 sometimes differs among different batteries of the battery units BU. While, in the first, particular example, electric power of 12 W is consumed by the charger circuit 41, it is assumed that, in the second particular example, the charger circuit 41 consumes electric power of 8 W. In this instance, the electric power actually charged into the two battery units is 200 W-16 W, which is power consumption by the two charger circuits, and hence is 184 W.

Since the supply amount of the photovoltaic power generation exceeds the demand amount by the battery unit side, usually the number of charging target units is increased. However, the second unit number controlling process carries out control so that electric, power from the electric power generation section can be used more efficiently taking the power consumption by the charger circuit into consideration.

For example, it is assumed that the charging target unit number is increased to three. In this instance, since the demand amount by the battery unit side, which is 300 W, exceeds the supply amount from the photovoltaic power generation, which is 210 W, the cooperation control is turned on. All of the supply amount of the photovoltaic power generation is used as charge power. Therefore, no loss occurs. In this instance, the effective charge power is 210 W-24 W, which is electric power consumed by the three charger circuits, and hence is 186 W.

If the effective charge powers in both cases are compared with each other, then the effective charge power of 186 W represents more efficient use of the supply amount from the photovoltaic power generation. In such an instance, the charging target unit number is increased to three. If the charging target unit number at present is three, then it is not decreased bat is maintained. In this manner, electric power supplied from the photovoltaic power generation is used efficiently taking the power consumption of the charger circuits into consideration.

The supply amount from the photovoltaic power generation sometimes varies. For example, the sky clears up and the supply of the photovoltaic power generation described above, which is 210 W, increases to 220 W. In this instance, the effective charge power when the charging target unit number is two is 200 W-24 W and hence is 176 W. On the other hand, the effective charge power when the charging target unit number is three is 220 W-36 W and hence is 184 W. Consequently, the efficiency is higher where the charging target unit number is three, and therefore, the charging target unit number is increased to three from two. Or, the charging target unit number is left three but is not decreased. In this manner, also in a case in which the supply amount from the photovoltaic power generation varies, the charging target unit number can be set appropriately by carrying out comparison between the effective charge powers.

It is to be noted that the power consumption may differ among different charger circuits of the battery units. Also in this instance, since the total power consumption of the charger circuits can be calculated, the effective charge power can be determined.

FIG. 16 is a flow chart illustrating an example of a flow of the second unit number controlling process. Referring to FIG. 16, at step S11 after the second unit number controlling process is started, it is waited that a predetermined period of time elapses. The predetermined period of time is set, for example, to substantially several minutes. After the predetermined period of time elapses, the processing advances to step S12.

At step S12, measurement of the received power voltage and the current value is carried out, and the measured received power voltage and current value are recorded. Then, the processing advances to step S13. At step S13, it is decided whether or not a received power voltage and a current value have been recorded by a predetermined number of times. If a received power voltage and a current value have not been recorded by the predetermined number of times, then the processing returns to step S11. Then, after the predetermined period of time elapses, the measurement and recording of a received power voltage and a current value are carried out again. If a received power voltage and a current value have been recorded by the predetermined number of times, then the processing advances to step S14.

At step S14, a voltage-current characteristic, namely, a V-I curve, of the photovoltaic power generation is estimated. Then, the processing advances to step S15. At step S15, it is decided whether or not the cooperation control is on. This decision is made through comparison between the received power voltage and a threshold value. If the received power voltage (supply) is equal to or lower than the threshold value (demand), then it is decided that the cooperation control is on, and the processing advances to step S16. However, if the received power voltage is higher than the threshold value, then it is decided that the cooperation control is off, and the processing advances to step S20. The threshold value is set to the voltage $Vt_0$ or a value a little higher than the voltage $Vt_0$.

That the cooperation control is on signifies that the demand amount of the battery unit is equal to or exceeds the supply amount from the photovoltaic power generation. Accordingly, the processes at step S16 are those for deciding whether or not the charging target unit number into be decreased.

At step S16, charge power when the charging target unit number is decreased is calculated. For example, in the first particular example of FIG. 14, the charge power when the charging target unit number is decreased from three to two is calculated as 200 W. Then, the processing advances to step S17. At step S17, the difference between the supply power at present from the photovoltaic power generation and the electric power calculated at step S16 is calculated. Then, an absolute value of the difference is calculated. The absolute value of the difference is suitably referred to as difference power. If it is assumed that the supply power at present from the photovoltaic power generation is 210 W, then the difference power is 210 W-200 W and therefore is calculated as 10 W. Then, the processing advances to step S18.

At step S18, the difference power and the power consumption by the charger circuit are compared with each other. In the first particular example, the power consumption of the charger circuit per one unit is 12 W. Therefore, the decision at step S18 is NO, and the processing returns to step S11. In other words, the charging target unit number is not decreased. In the case where the power consumption by the charger circuit per one unit is 8 W as in the case of the second particular example described hereinabove, the processing advances to step S19, at which a process of decreasing the charging target unit number is carried out. Then, the processing returns to step S11.

That the decision at step S15 is that the cooperation control is off signifies that the supply amount from the photovoltaic power generation exceeds the demand amount by the battery unit. Accordingly, the processes at the steps beginning with step S20 decide whether or not the charging target unit number should be increased.

At step S20, surplus electric power is calculated. The surplus electric power is excessive electric power, for example, until the cooperation control is carried out. In the first particular example of FIG. 14, where the charging target unit number is two, the charge power is 200 W. If the charging target unit number increases to three, then the cooperation control is carried out, and therefore, the surplus electric power is calculated as 10 W. Then, the processing advances to step S21.

At step S21, the surplus electric power and the power consumption by the charger circuit are compared with each other. In the first particular example, the power consumption by the charger circuit per one unit is 12 W. Therefore, the decision at step S21 is NO, and the processing returns to step S11. In other words, the charging target unit number is not increased. In the case where the power consumption by the charger circuit per one unit is 8 W similarly as in the case of the second particular example described hereinabove, the processing advances to step S22. At step S22, a process of increasing the charging target unit number is carried out. Then, the processing returns to step S11.

As described, above, the number of battery units for which a charging process is to be carried out is changed taking, for example, the power consumption of the charger circuit into consideration. Consequently, the electric power supplied from the electric power generation section can be used to efficiently carry out charge into the battery units.

The first and second unit number controlling processes described hereinabove may be executed in combination. For example, the processes at steps S16 to S19 may be carried out between the steps 28 and 59, and the processes at steps S20 to S22 may be carried out between the steps S6 and S7. The processes at steps S11 to S14 may be carried out in advance.

<2. Modifications>

Although the embodiment of the present disclosure has been described, the present disclosure is not limited to the embodiment described above but can be modified in various forms. All of the configurations, numerical values, materials and so forth in the present embodiment are mere examples, and the present disclosure is not limited to the configurations and so forth given as the examples. The configurations and so forth given as the examples can be suitably changed within a range within which no technical contradiction occurs.

The control unit and the battery unit in the control system may be portable. The control system described above may be applied, for example, to an automobile or a house.

It is to be noted that the present disclosure may have such configurations as described below.

(1)

A control apparatus, including:

a supplying section to which a voltage which varies in response to a variation of a state is supplied from an electric power generation section; and a control section configured to change the number of battery units, for which charging is to be carried out, in response to a relationship between the voltage and a reference value.

(2)

The control apparatus according to (1), wherein the control section increases the number of battery units when the voltage is higher than the reference value but decreases the number of battery units when a state in which the voltage is equal to or lower than the reference value continues for a predetermined period of time.

(3)

The control apparatus according to (1), wherein the control section calculates first electric power when the voltage is equal to or lower than the reference value and decreases the number of battery units when the first electric power is higher than power consumption of a charging controlling section which the battery units have, and calculates second electric power when the voltage is higher than the reference value and increases the number of battery units when the second electric power is higher than the power consumption of the charging controlling section which the battery units have.

(4)

The control apparatus according to (3), wherein the first electric bower is a difference between the electric power supplied from the electric bower generation section and total electric power of the battery units when the number of battery units is decreased, and the second electric power is a difference between the power supplied form the electric power generation section and the total electric power by the battery units.

(5)

The control apparatus according to any one of (1) to (4), wherein the electric power generation section is configured from a photovoltaic power generation section.

(6)

A control method, including:

supplying a voltage, which varies in response to a variation of a state, from an electric power generation section; and changing the number of battery units, for which charging is to be carried out, in response to a relationship between the voltage and a reference value.

The present disclosure contains subject matter related to that disclosed in Japanese Priority Patent Application JP 2011-244038 filed in the Japan Patent Office on Nov. 7, 2011, the entire content of which is hereby incorporated by reference.

What is claimed is:

1. A control apparatus, comprising:

a supplying section to which a voltage is supplied from an electric power generation section, wherein the voltage varies in response to a variation in one or more conditions; and a control section configured to change a number of battery units, for which charging is to be carried out, in response to a relationship between the voltage and a reference value, wherein the control section increases the number of battery units when the voltage is higher than the reference value but decreases the number of battery units when a state in which the voltage is equal to or lower than the reference value continues for a predetermined period of time.

2. The control apparatus according to claim 1, wherein the control section calculates first electric power when the voltage is equal to or lower than the reference value and decreases the number of battery units when the first electric power is higher than power consumption of a charging controlling section which the battery units have, and calculates second electric power when the voltage is higher than the reference value and increases the number of battery units when the second electric power is higher than the power consumption of the charging controlling section which the battery units have.

3. The control apparatus according to claim 2, wherein the first electric power is a difference between the electric power supplied from the electric power generation section and total electric power of the battery units when the number of battery units is decreased, and the second electric power is a difference between the electric power supplied form the electric power generation section and the total electric power by the battery units.

4. The control apparatus according to claim 1, wherein the electric power generation section is configured from a photovoltaic power generation section.

5. A control method, comprising:

supplying a voltage from an electric power generation section, wherein the voltage varies in response to a variation in one or more conditions;

changing a number of battery units, for which charging is to be carried out, in response to a relationship between the voltage and a reference value; and increasing the number of battery units when the voltage is higher than the reference value, but decreasing the number of battery units when a state in which the voltage is equal to or lower than the reference value continues for a predetermined period of time.

6. The control method according to claim 5, further comprising:

calculating first electric power when the voltage is equal to or lower than the reference value and decreasing the number of battery units when the first electric power is higher than power consumption of a charging controlling section which the battery units have; and calculating second electric power when the voltage is higher than the reference value and increasing the number of battery units when the second electric power is higher than the power consumption of the charging controlling section which the battery units have.

7. The control method according to claim 6, wherein the first electric power is a difference between the electric power supplied from the electric power generation section and total electric power of the battery units when the number of battery units is decreased, and the second electric power is a difference between the electric power supplied form the electric power generation section and the total electric power by the battery units.

8. The control method according to claim 5, wherein the electric power generation section is configured from a photovoltaic power generation section.

* * * * *